(12) United States Patent
Hosoda

(10) Patent No.: US 7,689,108 B2
(45) Date of Patent: Mar. 30, 2010

(54) IMAGING APPARATUS, DATA EXTRACTION METHOD, AND DATA EXTRACTION PROGRAM

(75) Inventor: Jun Hosoda, Hanno (JP)

(73) Assignee: Casio Computer Co., Ltd., Tokyo (JP)

( * ) Notice: Subject to any disclaimer, the term of this patent is extended or adjusted under 35 U.S.C. 154(b) by 548 days.

(21) Appl. No.: 11/520,552

(22) Filed: Sep. 13, 2006

(65) Prior Publication Data

US 2007/0058957 A1  Mar. 15, 2007

(30) Foreign Application Priority Data

Sep. 14, 2005  (JP)  ............................. 2005-266266

(51) Int. Cl.
*G03B 17/00* (2006.01)
(52) U.S. Cl. .................... 396/55; 348/208.5; 348/208.6
(58) Field of Classification Search ............ 348/208.99, 348/208.12, 208.16, 208.4–208.6, 208.13; 396/234, 270, 52–55
See application file for complete search history.

(56) References Cited

U.S. PATENT DOCUMENTS

| | | | | |
|---|---|---|---|---|
| 5,913,081 | A * | 6/1999 | Okano et al. .................. 396/55 |
| 6,100,927 | A * | 8/2000 | Ogino .................... 348/208.14 |
| 6,172,707 | B1 * | 1/2001 | Ouchi et al. ............. 348/208.6 |
| 7,057,645 | B1 * | 6/2006 | Hara et al. ............... 348/208.6 |
| 7,305,179 | B2 * | 12/2007 | Ogawa ........................ 396/54 |
| 7,372,483 | B2 * | 5/2008 | Nomura et al. ........ 348/208.99 |
| 7,397,498 | B2 * | 7/2008 | Hosoda et al. ......... 348/207.99 |
| 7,505,067 | B2 * | 3/2009 | Ogawa et al. .......... 348/208.99 |
| 2001/0010544 | A1 * | 8/2001 | Wakui ........................ 348/208 |
| 2001/0055067 | A1 * | 12/2001 | Wada ......................... 348/241 |

(Continued)

FOREIGN PATENT DOCUMENTS

JP  4-74070 A  3/1992

(Continued)

OTHER PUBLICATIONS

Notification Concerning Transmittal of International Search Report and Written Opinion of the International Searching Authority, Dated Nov. 30, 2006, for PCT/JP2006/318676, 10 sheets.

*Primary Examiner*—W. B. Perkey
*Assistant Examiner*—Dennis Hancock
(74) *Attorney, Agent, or Firm*—Frishauf, Holtz, Goodman & Chick, P.C.

(57) ABSTRACT

When a camera shake correction function is set to "on", a control unit exposes a CCD. Simultaneously during the exposure, the control unit generates a CCD drive signal for changing relative positions of the CCD and a lens in accordance with a shake detection signal received from a pose sensor. In response to this signal, the position of the CCD is shifted in X and Y directions perpendicular to the optical axis of the lens, thereby camera shake correction is performed. Next, the control unit outputs an imaging signal obtained by using the inside of a use range for camera shake correction within the CCD. On the other hand, when the camera shake correction function is set to "off", the control unit exposes the CCD while the CCD is fixed at a center position. The control unit outputs an imaging signal obtained by using the entire area of the CCD.

16 Claims, 14 Drawing Sheets

U.S. PATENT DOCUMENTS

| | | | |
|---|---|---|---|
| 2002/0094200 A1* | 7/2002 | Yamaguchi | 396/55 |
| 2005/0062852 A1* | 3/2005 | Yamazaki | 348/208.6 |
| 2005/0259155 A1* | 11/2005 | Okada | 348/207.99 |
| 2005/0276590 A1* | 12/2005 | Ishikawa et al. | 396/55 |
| 2006/0087562 A1* | 4/2006 | Nakanishi et al. | 348/208.12 |

FOREIGN PATENT DOCUMENTS

| | | |
|---|---|---|
| JP | 7-203279 A | 8/1995 |
| JP | 2004-258250 A | 9/2004 |
| JP | 2005-084592 A | 3/2005 |

\* cited by examiner

IMAGING APPARATUS, DATA EXTRACTION METHOD, AND DATA EXTRACTION PROGRAM

BACKGROUND OF THE INVENTION

1. Field of the Invention

The present invention relates to an imaging apparatus such as a digital camera, etc. having a camera shake correction function, and a data extraction method and a data extraction program for an imaging apparatus.

2. Description of the Related Art

As camera shake correction methods for a digital camera, etc. as an imaging apparatus, there have been 1) a lens shifting method of moving a correction lens, and 2) a CCD sensor shifting method of fixing an optical system and moving a CCD in vertical and horizontal directions perpendicular to the optical axis of the optical system.

SUMMARY OF THE INVENTION

According to one preferred embodiment of the present invention an imaging apparatus includes an imaging element which opto-electrically converts an image formed by an optical system and outputs an imaging signal; a shake detection unit which detects a shake of the apparatus and outputs a shake detection signal; a shake correction unit which performs shake correction (camera shake correction) by changing relative positions of the imaging element and the optical system based on the shake detection signal from the shake detection unit; a shake correction necessity determining unit which determines whether or not shake correction should be performed by the shake correction unit; and a control unit which processes an imaging signal read out from a predefined first specific area of the imaging element in a case where the shake correction necessity determining unit determines that shake correction is to be performed, and processes an imaging signal read out from a second specific area of the imaging element that is larger than the first specific area and includes the first specific area in a case where the shake correction necessity determining unit determines that shake correction is not to be performed.

According to one preferred embodiment of the present invention, there is provided a computer-readable recording medium storing a data extraction program which controls a computer of an imaging apparatus having an imaging element which opto-electrically converts an image formed by an optical system and outputs an imaging signal; a shake detection unit which detects a shake of the apparatus and outputs a shake detection signal; and a shake correction unit which performs shake correction by changing relative positions of the imaging element and the optical system based on the shake detection signal from the shake detection unit. The program controls the computer to perform a function of determining whether or not shake correction should be performed by the shake correction unit; and a controlling function of processing an imaging signal read out from a predefined first specific area of the imaging element in a case where it is determined by the determining function that shake correction is to be performed, and processing an imaging signal read out from a second specific area of the imaging element that is larger than the first specific area and includes the first specific area in a case where it is determined that shake correction is not to be performed.

According to the present invention, it is possible to perform shake correction by using an imaging element having a size corresponding to the lens size.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Figure 1A:
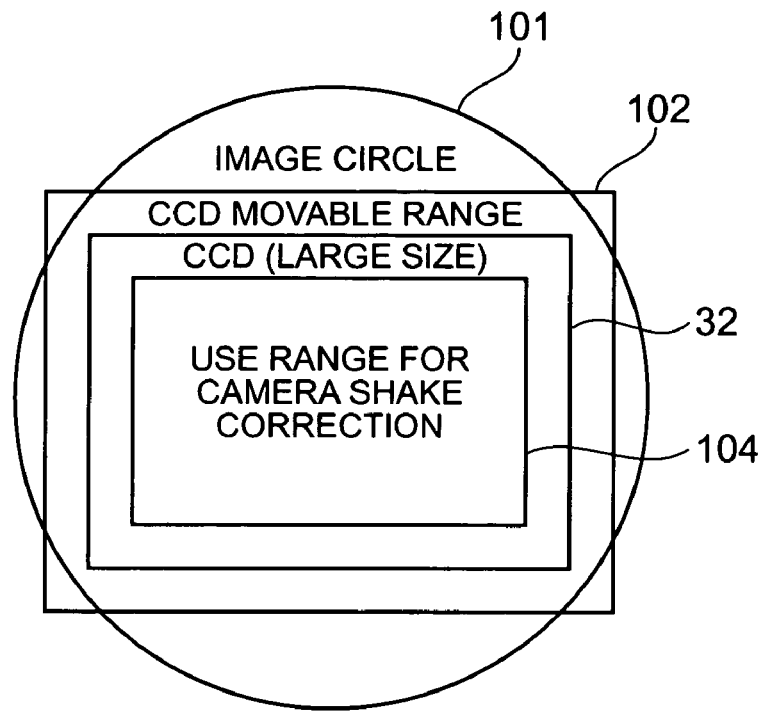
FIG. 1A is a diagram showing the principle of camera shake correction of a digital camera based on the present invention.
Figure 1B:
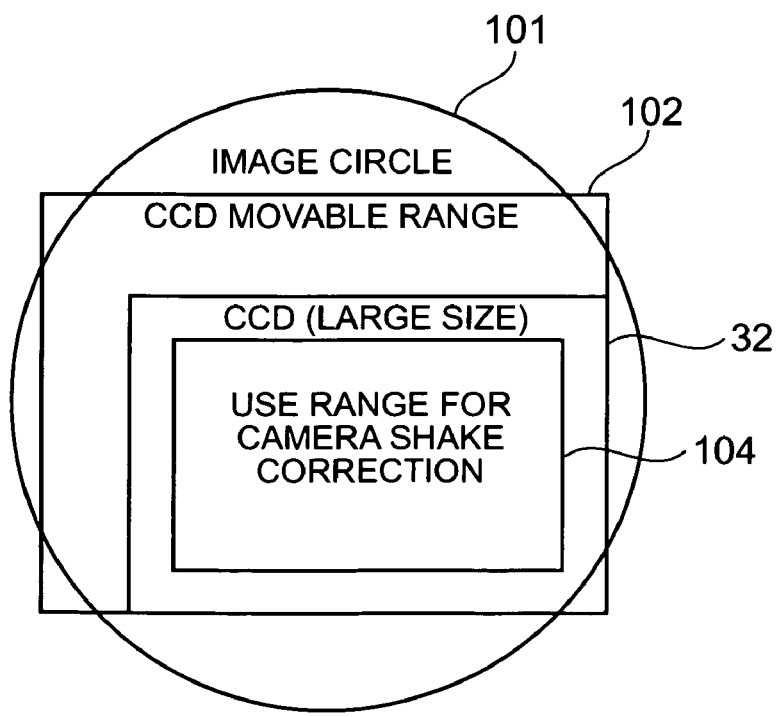
FIG. 1B is a diagram showing the principle of camera shake correction of a digital camera based on the present invention.

FIGS. 1A and 1B are diagrams showing the principle of camera shake correction by a digital camera as an imaging apparatus according to the present invention. The reference numeral 101 indicates an image circle, the reference numeral 32 indicates a CCD, the reference numeral 102 indicates a CCD movable range, and the reference numeral 104 indicates the range of area to be used within the CCD 32 at the time of camera shake correction (hereinafter this range will be referred to as use range 104). FIG. 1A shows a case that the CCD 32 is positioned at the center of the image circle 101, i.e., no camera shake correction is performed (camera shake correction function is turned off). FIG. 1B shows a case that the CCD 32 is moved to the lower right of the image circle 101 when the camera shake correction function is turned on.

According to the present invention, in a case where camera shake correction is not to be performed, the entire area of the CCD 32 is used as shown in FIG. 1A. The area of the CCD 32 that is to be used in a case where camera shake correction is not performed will be referred to as second specific area. On the other hand, in a case where camera shake correction is to be performed, a specific area (that is, the use range 104) of the CCD 32 is used as shown in FIG. 1B. The specific area of the CCD 32 to be used in a case where camera shake correction is to be performed will be referred to as first specific area. In this manner, the area within the CCD 32 that is to be used is controlled in accordance with whether camera shake correction is required or not. This makes it possible to provide a digital camera that uses a CCD having a size matching the size of the lens of the digital camera.

Note that the area of the CCD 32 will particularly be presented as an area in which pixels are formed in the CCD 32.

Though FIGS. 1A and 1B show a case that the first specific area of the CCD 32 has its center position coincide with that of the second specific area of the CCD 32, this is not the only case.

Figure 2A:
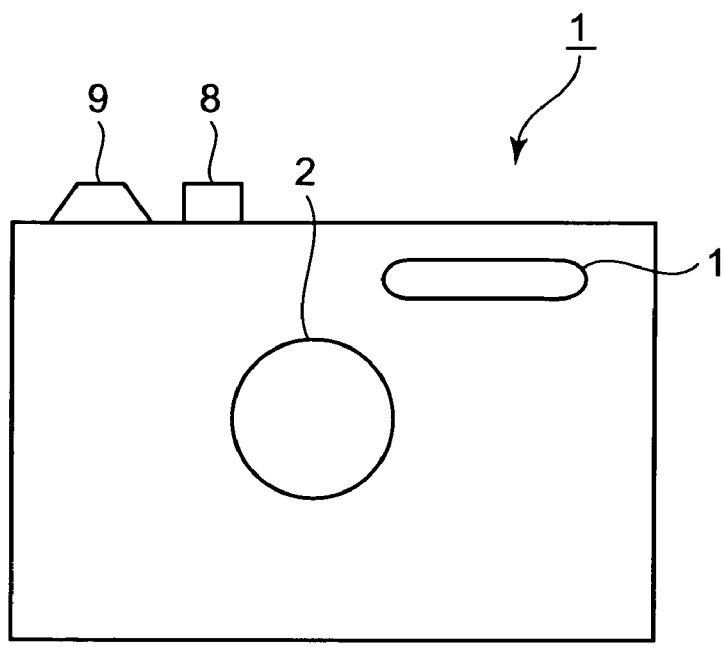
FIG. 2A is a diagram showing an appearance of one embodiment of a digital camera.
Figure 2B:
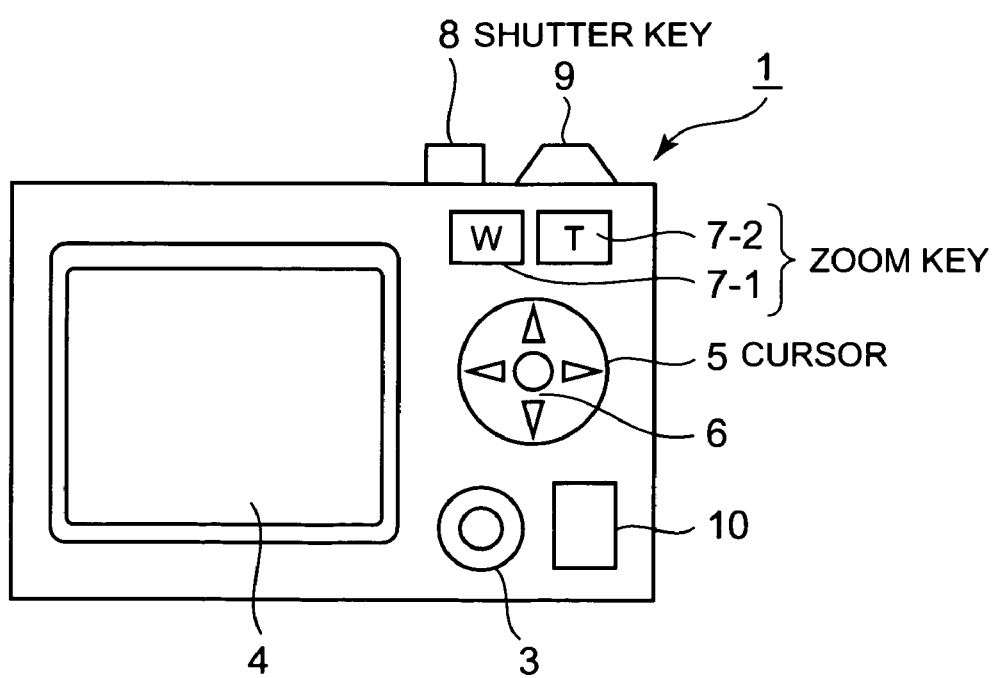
FIG. 2B is a diagram showing an appearance of one embodiment of a digital camera.

FIGS. 2A and 2B are diagrams showing the appearances of a digital camera 1 as the first embodiment of the imaging apparatus according to the present invention. Here, principally the appearances of the front surface (FIG. 2A) and the back surface (FIG. 2B) are shown.

As shown in FIG. 2A, the digital camera 1 comprises a strobe light emitting unit 1 and imaging lenses (lens group) 2 on its front surface. Further, the digital camera 1 comprises a mode dial 3, a liquid crystal monitor screen 4, a cursor key 5, a SET key 6, a zoom key 7 (W button 7-1, T button 7-2), a key 10, etc. on its back surface as shown in FIG. 2B. A shutter key 8 and a power button 9 are provided on the top surface. Furthermore, a USB terminal connection portion (unillustrated) to be used when the apparatus is connected to an external apparatus such as a personal computer (hereinafter referred to as PC), a modem, etc. using a USB cable, is provided on the side surface.

Figure 3:
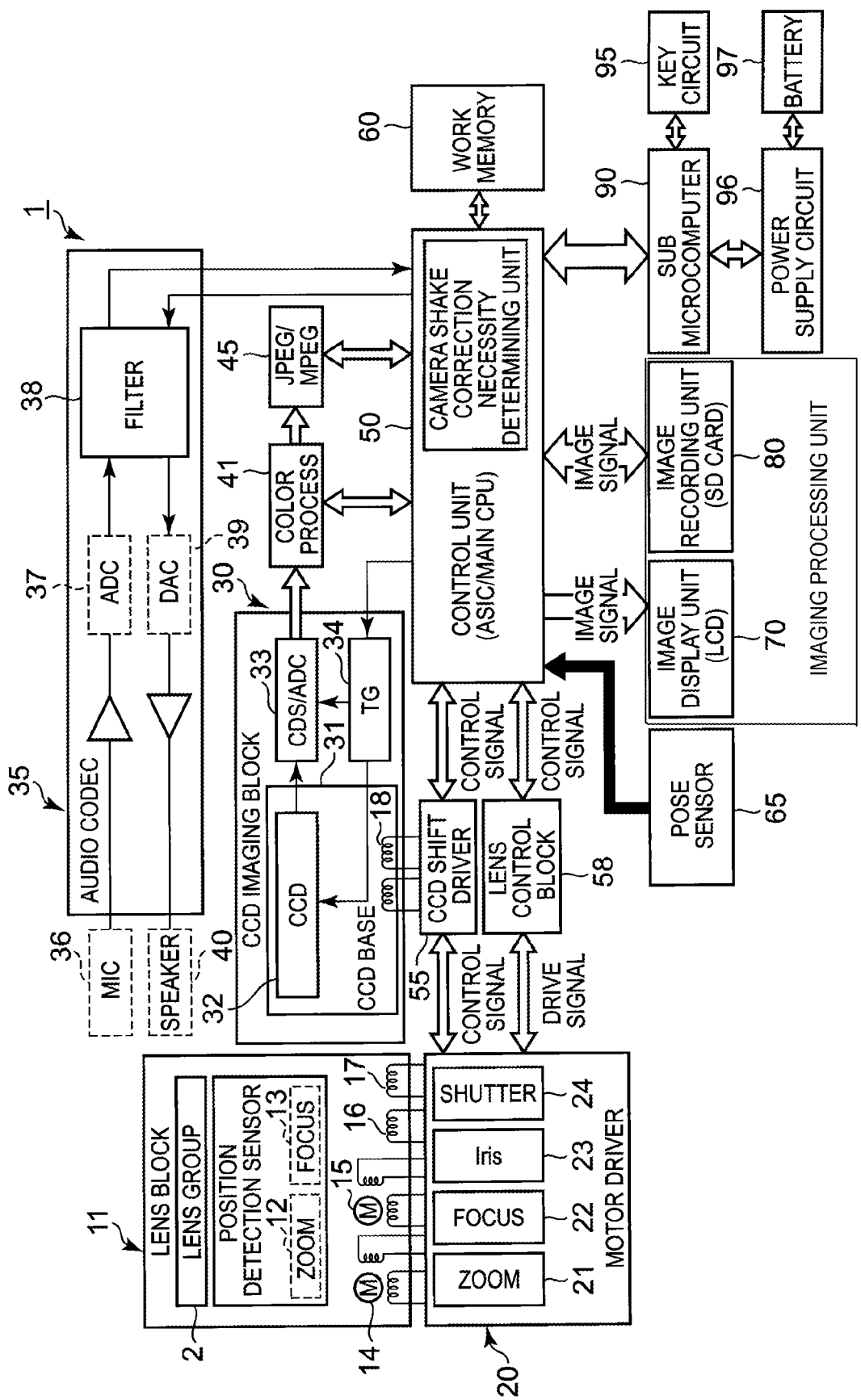
FIG. 3 is a block diagram showing one embodiment of a circuit structure of a digital camera.

FIG. 3 is a block diagram showing one embodiment of the circuit structure of the digital camera 1. The digital camera 1 has an optical zoom function and an auto focus (AF) function. The digital camera 1 comprises a lens block 11 for realizing these functions.

The lens block 11 is provided with the lens group 2, which comprises a zoom lens and focus lens which can be moved in the direction of the optical axis, position detection sensors 12 and 13 for detecting the zoom position (zooming degree) and focus position of the lens group 2, a zoom motor 14 for moving the zoom lens, a focus motor 15 for moving the focus lens, an iris actuator 16 for opening or closing an iris (unillustrated), and a shutter actuator 17 for opening or closing a mechanical shutter. The motors and actuators 14 to 17 are driven by drivers 21 to 24 (for zoom (ZOOM), focus (Focus), iris (Iris), and shutter (Shutter)) provided in a motor driver block 20.

The position detection sensors 12 and 13 and the drivers 21 to 24 in the motor driver block 20 operate in accordance with a control signal from a lens control block 58. These sensors and drivers send information such as sensor output, motor rotation rate, etc. to a control unit (CPU/(Application Specific Integrated Circuit)) 50 via the lens control block 58.

The digital camera 1 further comprises a CCD imaging block 30, which includes a CCD (imaging element) 32 provided on a CCD base (CCD BASE) 31 mostly disposed behind the lens group 2 along the axis of a shooting light, a CDS (Correlated Double Sampling)/ADC block 33, and a TG (Timing Generator) 34.

When the camera shake correction function is turned on, the CCD base 31 moves (shifts) in the vertical and horizontal directions perpendicular to the optical axis of the lenses within the CCD movable range, under the control of the control unit 50.

The CCD 32 opto-electrically converts an optical image of a photo object formed by the lens group 2, when the digital camera 1 is set to a recording mode. Simultaneously, the CCD 32 is scanned in accordance with the TG 34 and outputs opto-electrically converted data for one frame at a regular time interval. In a case where camera shake correction is to be performed, imaging is performed with the use of the specific area (use range 104) of the CCD 32 as shown in FIG. 1B. That is, the CCD 32 is driven under the control of the control unit 50 to be partially extracted, such that only the pixel data within the use range 104 will be read out.

An imaging signal, after being output from the CCD 32, has its gain adjusted if needed, for the respective color components of RGB. The CDS/ADC block 33 denoises this analog output signal by correlated double sampling, converts it into a digital signal, and outputs it to a color process circuit 41. Note that the CCD 32 is one type of imaging element, and other types of elements, such as CMOS may also be used.

An audio block (audio CCDEC) 35 comprises an audio input system and an audio output system. The audio input system comprises a microphone (MIC) 36 for receiving an audio and converting it into an analog audio signal, an A/D converter (ADC) 37 for converting an analog audio signal into a digital audio signal and sending it to the control unit 50 via a filter 38, etc. On the other hand, the audio output system comprises a D/A converter (DAC) 39 for converting a digital audio signal received from the control unit 50 via the filter 38 into an analog audio signal, a speaker (Speaker) 40 for converting an analog audio signal to restore an audio, amplifying it, and outputting it to the outside, etc.

An audio signal sent to the control unit 50 via the microphone 36 and the A/D converter 37 is taken into a work memory 60. At the time of recording, the signal taken into the work memory 60 is subjected to audio compression, and recorded together with a compressed moving image file, on an recording medium (such as an SD card) detachably attached on an image recording unit 80, as a moving image file (moving image data+audio data).

The color process circuit 41 applies a color process for pixel interpolation to an imaging signal input thereto, and generates a luminance signal (Y) and color difference signals (Cb, Cr) which have digital values. Then, the color process circuit 41 outputs the generated signals to the control unit 50, which is a control means of the present invention, that controls the entire digital camera 1.

In a still image shooting mode, a JPEG/MPEG unit 45 compresses still image data taken in the work memory 60 by applying JPEG data compression at the time of recording. In JPEG data compression, the JPEG/MPEG unit 45 converts the data by ADCT (Adaptive Discrete Cosine Transform), and then applies Huffman coding, which is an entropy coding method. Then, control unit 50 records the obtained coded data, in the form of a data file for one frame, on an SD card in the image recording unit 80.

In a moving image shooting mode, at the time of recording, the JPEG/MPEG unit 45 compresses a series of moving image data taken in the work memory 60 by an MPEG (Moving Picture Experts Group) scheme, etc. Then, control unit 50 records the obtained coded data, in the form of a data file of a moving image, on an SD card in the image recording unit 80.

The JPEG/MPEG unit 45 is adapted to a plurality of compression rates. A recording mode of low compression rates (generally called high precision, fine, normal, etc.), and a recording mode of low compression rates (generally called economy, etc.), are provided.

Further, the JPEG/MPEG unit 45 is also adapted to a wide range of resolutions, such as the following; QXGA (Quad eXtended Graphics Array (2048×1536)), UXGA (Ultra eXtended Graphics Array (1600×1200)), SXGA+ (SXGA Plus (1400×1050)), SXGA (Super eXtended Graphics Array (1280×1024)), XGA (eXtended Graphics Array (1024×786)), SVGA (Super Video Graphics Array (800×600)), VGA (Video Graphics Array (640×480)), QVGA (Quarter VGA (320×240)), etc.

The control unit 50 is actually a microprocessor comprising an internal memory such as a RAM, a flash memory, or the like, computing circuits of various types, an interface of data input and output, etc. The control unit 50 temporarily stores the digital signals (image signals) sent thereto in the work memory 60 constituted by a DRAM or the like, and also sends them (image signals) to an image display unit 70. Further, the control unit 50 compresses luminance and color difference signals for one frame that are temporarily stored in the work memory 60 and also performs the recording of the compressed data on a recording medium (for example, an SD card) in the image recording unit 80.

The control unit 50 controls the lens control block 58 to generate a drive signal to be sent to the drivers 21 to 24 in the motor driver block 20 mentioned above, based on lens operation programs of various types and operation signals from a key circuit 95, etc. This signal controls the position of the zoom lens and focus lens, the opening degree of the iris, and the opening and closing operation of the mechanical shutter. At this time, information about the positions of the zoom lens and focus lens is sequentially input to the control unit 50 via the lens control block 58. The information about the positions of these lenses are detected by the position detection sensors 12 and 13 for detecting the zoom position and focus position.

Further, the control unit 50 processes a pose detection signal from a pose sensor 65, in a case where the camera shake correction function is turned on (or it is determined that camera shake correction is needed). That is, the control unit 50 generates a drive signal to be sent to a CCD shift driver 55 for moving the CCD base 31 in an X direction and a Y direction. The CCD shift driver 55 drives the CCD actuator 18, and controls the moving (shifting) operation of the CCD base 31 (i.e., the CCD 32). At that time, the control unit 50 controls the CDS/ADC block 33 and the color process circuit 41 so that an image signal within the use range for camera shake correction, that is output from the CCD 32 (by the CCD 32 being driven in a partially extracted manner, an image signal of a specific area of the CCD 32 is output from the CCD 32) may appropriately be processed.

Instead of driving the CCD 32 in a partially extracted manner, an image signal obtained by using the full area of the CCD 32 may temporarily be stored in the work memory 60. An image signal within the use range for camera shake correction may only be read out (extracted) from the stored image signal and displayed on the image display unit 70. Or, the stored image signal may be recorded on an SD card in the image recording unit 80.

Further, instead of driving the CCD 32 in a partially extracted manner, an image signal obtained by using the full area of the CCD 32 may be partially extracted (trimmed) by the CDS/ADC block 33 or the color process circuit 41.

It is also possible to obtain an imaging signal within the use range for camera shake correction, by controlling both the pixel reading range of the CCD 32 and the extracting (trimming) range of the imaging signal output from the CCD 32. For example, the CCD 32 may extract the pixel reading range to be used, while the color process circuit 41 may extract the output imaging signal.

The pose sensor 65 detects a camera shake of the digital camera 1. For example, an acceleration sensor may be used as the pose sensor 65. A pose detection result of the pose sensor 65 is output to the control unit 50 as a camera shake detection signal.

The image display unit 70 comprises a video encoder, a VRAM controller, a VRAM, a liquid crystal display monitor, and a drive circuit for the monitor. The image display unit 70 generates a video signal based on a digital signal sent thereto, by the video encoder. Then, the image display unit 70 displays a display image based on the video signal, i.e., a through image of the photo object imaged by the CCD 32, menu data, etc. on the liquid crystal monitor screen 4.

Further, the image display unit 70 functions as a monitor display unit (electronic finder). The image display unit 70 performs a displaying operation based on a video signal from the video encoder, thereby displaying, in real time, an image based on image information acquired from the VRAM controller at that time.

The image recording unit 80 specifically comprises a card interface and a non-volatile memory card of any kind (for example, an SD card). The memory card is connected to the control unit 50 via the card interface, and detachably attached to the camera body. In a play mode, image data recorded by the image recording unit 80 is read out by the control unit 50, decompressed by the JPEG/MPEG unit 45, sent to the image display unit 70, and then displayed on the liquid crystal monitor screen 4. In a still image shooting mode, if the shutter key 8 is operated in a state that a through image is displayed (that is, a state that an image at that time is displayed by the image display unit 70 in real time as a monitor image), a trigger signal is generated. The control unit 50 stops the through image imaging process in accordance with this trigger signal and starts a still image shooting process. By this still image shooting process, luminance and color difference signals for one frame acquired from the CCD 32 are DMA-transferred to the work memory 60. After the transfer, the through image imaging process is resumed, and the luminance and color difference signals for one frame stored in the work memory 60 are JPEG-compressed by the JPEG/MPEG unit 45 and recorded on the SD card in the image recording unit 80. Here, the through image imaging process is for enabling the imaging process to be performed quickly. For this purpose, in the through image process, the CCD 32 is driven to perform pixel addition, or pixel decimation is performed by the CDS/ADC block 33 or the color process circuit 41, thereby to reduce the resolution (the number of pixels) of an image signal. On the other hand, in the still image shooting process, the CCD 32 has all of its pixels driven, or a longer time is spent for exposure than spent in the through image imaging process, thereby improving the image quality of an image signal.

Likewise in a moving image shooting mode, a trigger signal is generated when the shutter key 8 is operated while a through image is displayed. The control unit 50 continues the through image imaging process and the through image display process, while in accordance with this trigger signal, the control unit 50 controls the JPEG/MPEG unit 45 to MPEG-compress luminance and color difference signals for one frame acquired from the CCD 32 and sequentially stored in the work memory 60, and records the compressed data on the SD card in the image recording unit 80. In a case where the shutter key 8 is operated again or in a case where the SD card becomes full, the control unit 50 stops the compressing process and the recording process and returns to the state of displaying the through image.

A sub microcomputer 90 comprises a sub CPU/ASIC (unillustrated), which sends signals corresponding to operations on the various keys provided on the key circuit 95, to the control unit 50. Where necessary, the sub microcomputer 90 sends a status signal (hereinafter referred to as key information) indicative of the status of the mode dial 3 to the control unit 50. Further, the sub microcomputer 90 controls the turning on/off of a power supply circuit 96.

The key circuit 95 comprises the mode dial 3, the liquid crystal monitor screen 4, the cursor key 5, the SET key 6, the zoom key 7 (W button 7-1, T button 7-2), the shutter key 8, the power button 9, etc. as shown in FIG. 2. When any of these keys is operated, a signal corresponding to the kind of the key and the operation status is output to the sub microcomputer 90.

The mode dial 3 is a button for switching the moving image shooting mode and the still image shooting mode with a fingertip operation. When the mode dial 3 is pressed during the moving image shooting mode, the mode is switched to the still image shooting mode, and when the mode dial 3 is pressed during the still image shooting mode, the mode is switched to the moving image shooting mode.

The cursor key 5 is a key to be operated for moving a cursor to point at (designating) a menu, an icon, etc. displayed on the liquid crystal monitor screen 4, upon mode setting, menu selection, etc. The cursor can be moved up or down, left or right, by operations on the cursor key 5. The SET key 6 is a confirmation key to be pressed when an item designated by the cursor is selected or confirmed.

The zoom key 7 is used for zooming operation. In case of optical zoom, the zoom lens (variable focal length lens) is moved to a wide angle or to a telescopic angle in accordance with the operation on the zoom key 7 (W button 7-1 or T button 7-2). The zoom value is determined in accordance with the operation on the zoom key 7, the image actually changes so as to follow the change in the zoom value, and a wide image or a telescopic image is displayed on the liquid crystal monitor screen 4. In case of digital zoom, the zoom value is determined in accordance with the operation on the zoom key 7, but the actual angle of field does not change. That is, a trimmed image having a size corresponding to the zoom value is displayed on the liquid crystal monitor screen 4.

The shutter key 8 is for performing a release operation in the still image shooting mode, and has a two-step stroke. With a first-step operation (halfway pressing), a focus instruction signal for performing auto focus (AF) and automatic exposure (AE) processes is generated. With a second-step operation (full pressing), a shooting instruction signal for performing a shooting process is generated. The shutter key 8 can also be used as a moving image shooting start button and a moving image shooting finish button in the moving image shooting mode.

The key 10 is a key functioning as a menu key. When the key 10 is pressed, a menu of functions which can be selected at that time is displayed. The user can select the displayed menu by operating the cursor, etc. Further, the key 10 can be used as a camera shake correction function setting key.

Figure 4:
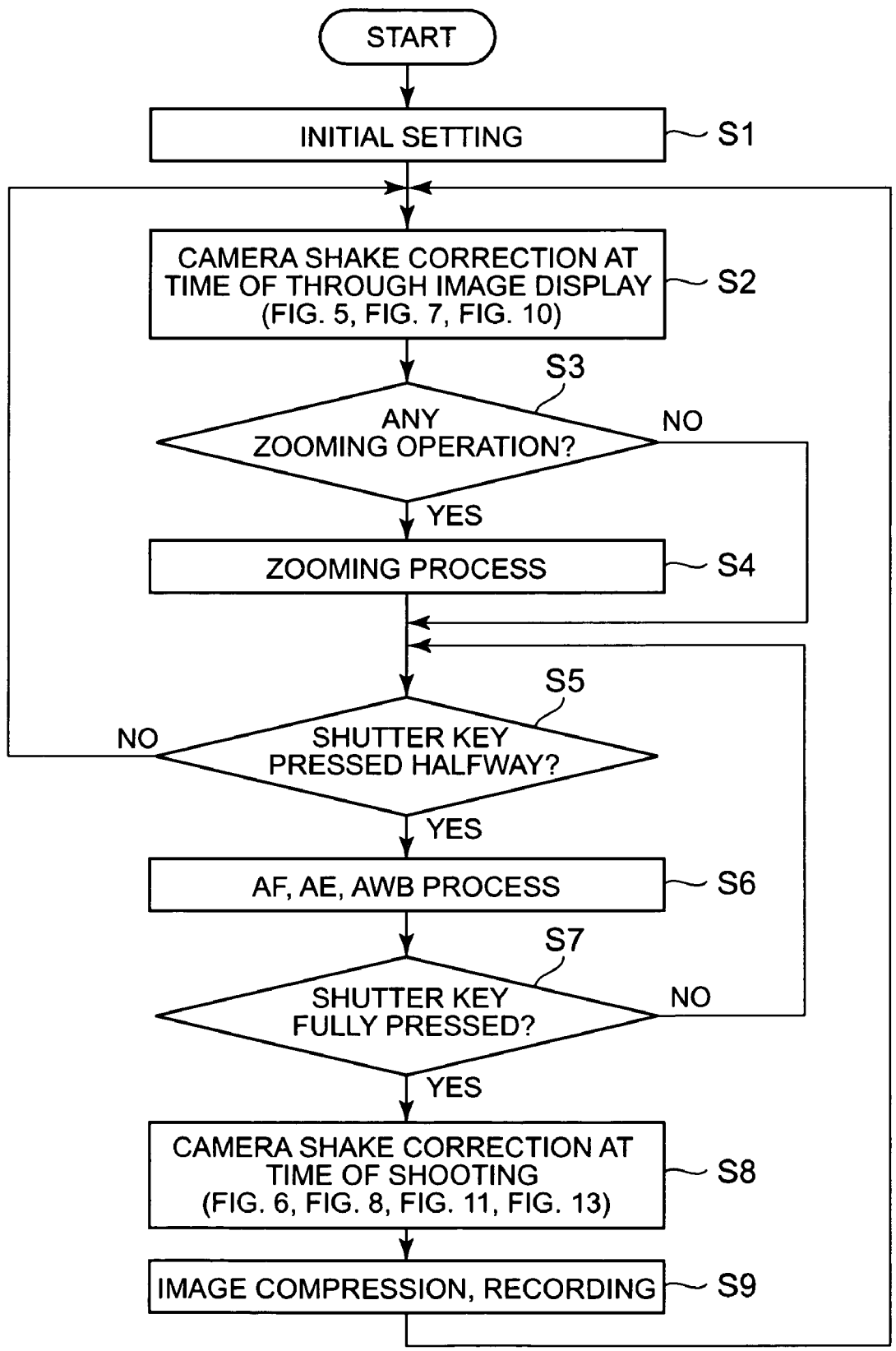
FIG. 4 is a process flowchart showing a schematic operation of a digital camera having a camera shake correction function according to the present invention.

FIG. 4 is a process flowchart showing a schematic operation of the digital camera 1 having the camera shake correction function according to the present invention. This flowchart is for explaining a program for controlling the digital camera 1 to realize the camera shake correction function according to the present invention. The process to be shown below will basically be explained in an example that the control unit 50 performs this process in accordance with a program pre-stored in a program memory such as a flash memory or the like. However, there is no need of storing the entire camera shake correction function in the program memory. This function may be realized by receiving a part or the entire function through a network, if necessary. The following explanation will be given based on FIGS. 1 to 4. The following explanation is based on the assumption that the digital camera 1 has a zoom function and an auto focus function. In FIG. 4, large quadrangles (steps S2 and S8) indicate steps showing processes for camera shake correction according to the present invention. On the other hand, small quadrangles (steps S1, S3 to S7, and S9) indicate steps showing processes from through image display to shooting, and to recording of the shot image.

In FIG. 4, when the main power of the digital camera 1 is turned on by the user operating on the power button 9, and when the user selects the still image shooting mode by operating the mode dial 3, the initial values and initial shooting conditions for the selected still image shooting mode are set. According to the initial setting after the still image shooting mode is selected, the camera shake correction function is set to "off" (step S1).

In response to turning on/off (or necessity/unnecessity) of the camera shake correction function during the through image display, the control unit 50 performs a camera shake correction process at the time of through image display, such as moving the CCD base 31, controlling the size of the use range of the CCD 32, etc., if the function is turned on (necessary). The camera shake correction process at the time of through image display will be explained based on the flowchart shown in FIG. 5 for embodiment 1, the flowchart shown in FIG. 7 for embodiment 2, and the flowchart shown in FIG. 10 for embodiment 3 (step S2).

The control unit 50 determines whether or not there is a zoom instruction (whether or not the W button 7-1 or the T button 7-2 are operated) based on a signal from the key circuit 95. In a case where there is a zoom instruction, the flow goes to step S4. In a case where there is no zoom instruction, the flow goes to step S5 (step S3).

In a case where there is a zoom instruction, the control unit 50 controls the lens block 11 to perform a zoom process. To be more specific, the control unit 50 sends a control signal for zoom (ZOOM) driver 21 provided in the motor driver block 20 to drive the zoom motor 14. The zoom motor 14 moves the zoom lens to a zoom position corresponding to a designated zooming degree (step S4).

The control unit 50 checks whether or not the shutter key 8 is pressed halfway, based on a signal from the key circuit 95. In a case where there is a halfway pressing operation, the flow goes to step S6. Otherwise, the flow returns to step S2 (step S5).

When the shutter key 8 is pressed halfway, the control unit 50 performs an auto focus (AF) process, an auto iris (AE) process, and a white balance process (AWB) at the focal length corresponding to the zoom position (zooming degree) selected at that time (step S6). Then, the control unit 50 displays the image data generated through the CCD imaging block 30 and the color process circuit 41 on the liquid crystal monitor screen 4 of the image display unit 70 as a through image. Simultaneously, the control unit 50 determines whether or not the shutter key 8 is fully pressed. At this time, in a case where the shutter key 8 is fully pressed, the flow goes to step S8. Otherwise, the flow returns to step S5 (step S7).

When still image shooting is instructed, i.e., when the shutter key 8 is fully pressed, the control unit 50 determines whether the camera shake correction function is turned on or off (or whether the camera shake correction is necessary or not). Based on the determination, the control unit 50 performs a camera shake correction process at the time of shooting. This camera shake correction process includes moving the CCD base 31, setting the size of the use range of the CCD 32, etc. The camera shake correction process at the time of still image shooting will be explained based on the flowchart shown in FIG. 6 for embodiment 1, the flowchart shown in FIG. 8 for embodiment 2, the flowchart shown in FIG. 11 for embodiment 3, and the flowchart shown in FIG. 13 for an embodiment 4 (step S8).

Next, the JPEG/MPEG unit 45 performs a JPEG compression on the image data (still image data) for one frame stored in the work memory 60. The compressed still image data is recorded on the SD card in the image recording unit 80 and the process of shooting a still image for one frame is completed (step S9). Thereafter, the flow returns to step S2 again.

Embodiment 1

Figure 5:
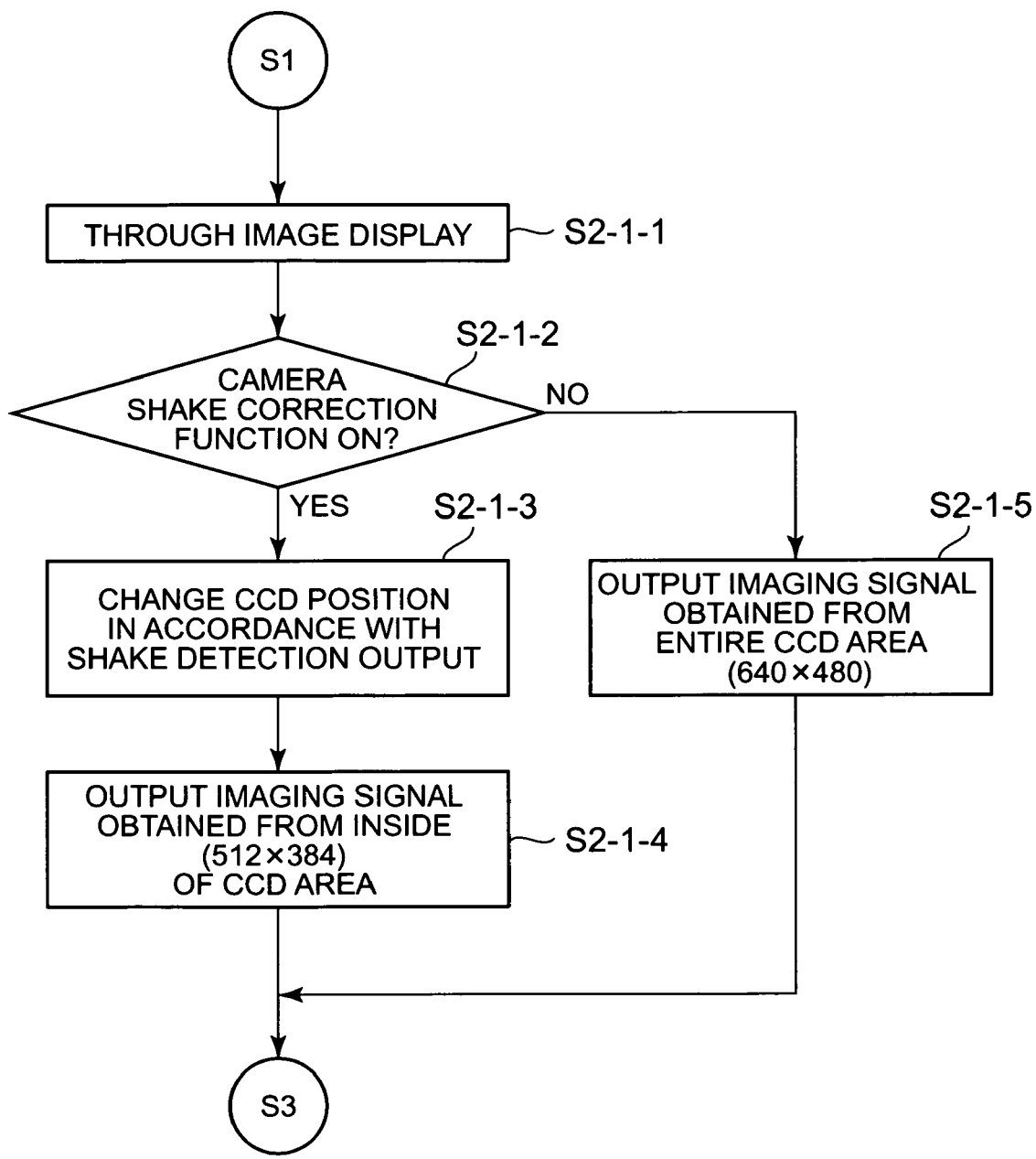
FIG. 5 is a flowchart showing one embodiment of a camera shake correction process at the time of through image display according to an embodiment 1.

The present embodiment shows an example that the camera shake correction function is set at step S2 in the flowchart of FIG. 4 to perform the camera shake correction process at the time of through image display (FIG. 5), and that the camera shake correction process at the time of still image shooting (FIG. 6) is performed at step S8 of FIG. 4. FIG. 5 is a flowchart showing one embodiment of the camera shake correction process at the time of through image display according to the present embodiment, and shows a detailed flowchart of step S2 of FIG. 4. The following explanation will be given based on FIGS. 1 to 5.

After the initial setting at step S1 of FIG. 4, the control unit 50 performs the AE process for through image with the shooting conditions at that time. Then, the control unit 50 controls the color process circuit 41, and applies the white balance (AWB) process to the image data obtained from the CCD 32. Then, the control unit 50 starts transferring the process result to the work memory 60. Simultaneously, the control unit 50 sends the process result to the liquid crystal monitor screen 4 of the image display unit 70 to start the through image display (step S2-1-1).

Next, the control unit 50 determines whether or not the user has pressed the key 10, based on a signal from the key circuit 95. If the key 10 is pressed, the control unit 50 displays a menu screen (unillustrated) including a camera shake correction function selecting menu to prompt menu selection to the user (step S2-1-2).

The control unit 50 further checks a signal from the key circuit 95. If the user selects the camera shake correction function, the control unit 50 turns on the camera shake correction function and goes to step S2-1-3. Otherwise, the control unit 50 goes to step S2-1-5. The setting of the turning on/off of the camera shake correction function can be made by storing the setting in a RAM. That is, an on/off setting flag area (unillustrated) for the camera shake correction function is secured in the RAM, and a flag value (for example, on→1, off→0) is stored in the area in accordance with whether the camera shake correction function is turned on or off (step S2-1-2).

If the camera shake correction function is turned on at the above-described step S2-1-2, the control unit 50 generates a drive signal to be sent to the CCD shift driver 55 in accordance with a shake detection value received from the pose sensor 65. CCD shift driver 55 drives the CCD actuator 18, which moves and changes the position of the CCD base 31 (i.e., the CCD 32) in the X direction and the Y direction perpendicular to the optical axis of the lenses, within the CCD movable range 102. After this, the flow goes to step S2-1-4 (step S2-1-3).

Next, the control unit 50 outputs an imaging signal obtained with the use of the inside of the use range 104 of the CCD 32 to the color process circuit 41 via the CDS/ADC block 33, and goes to step S3 of FIG. 4. Since at the time of through image display, pixel merging or pixel decimation is performed, the image size is set to a smaller size (for example, 512×384 pixels) than that at the time of still image shooting (step S2-1-4).

In a case where the camera shake correction function is turned off, the control unit 50 fixes the CCD base 31 (i.e, the CCD 32) at the center position. Further, the control unit 50 outputs an imaging signal obtained with the use of the full area of the CCD 32 to the color process circuit 41 via the CDS/ADC 33, and goes to step S3 of FIG. 4. Also in this case, since pixel merging or pixel decimation is performed at the time of through image display, the image size is set to a smaller size (for example, 640×480 pixels) than that at the time of still image shooting (step S2-1-5). The image signal output at step S2-1-4 or at step S2-1-5 is displayed as a through image at step S2-1-1.

Figure 6:
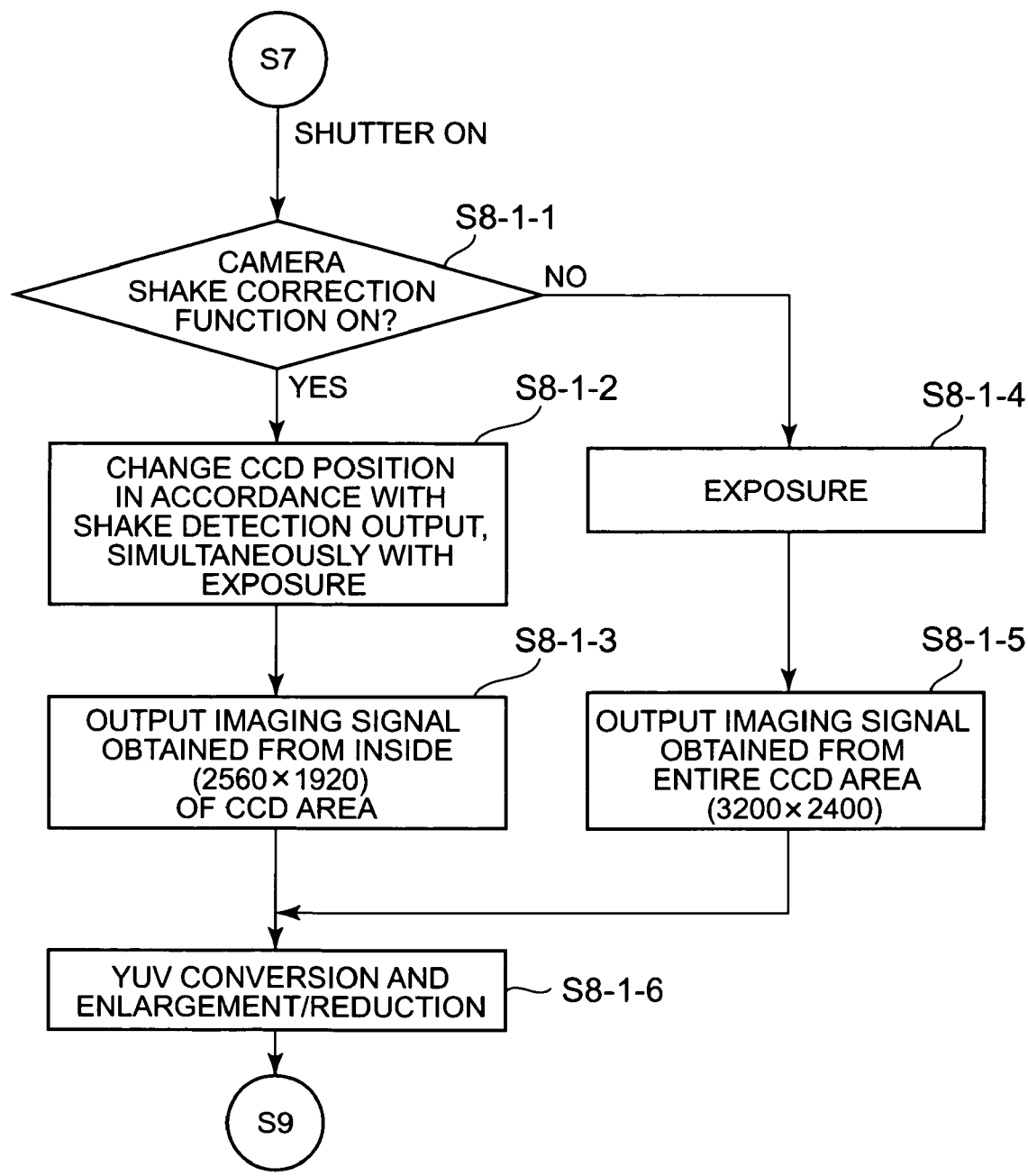
FIG. 6 is a flowchart showing one embodiment of a camera shake correction process at the time of still image shooting according to the embodiment 1.

FIG. 6 is a flowchart showing one embodiment of the camera shake correction process at the time of still image shooting according to the present embodiment, and shows a detailed flowchart of step S8 of FIG. 4. The following explanation will be given based on FIGS. 1 to 4 and FIG. 6.

In a case where it is determined at step S7 of FIG. 4 that the shutter key 8 is fully pressed, the control unit 50 checks the on/off setting flag area. In a case where the camera shake correction function is turned on, the control unit goes to step S8-1-2. Otherwise, the control unit 50 goes to step S8-1-4 (step S8-1-1).

If the camera shake correction function is turned on, the control unit 50 exposes the CCD 32, and at the same time during the exposure, generates a drive signal to be sent to the CCD shift driver 55 in accordance with a shake detection value received from the pose sensor 64. CCD shift driver 55 moves, the position of the CCD base 31 (i.e., the CCD 32) in the X direction and Y direction perpendicular to the optical axis of the lenses, within the CCD movable range 102 (step S8-1-2).

The control unit 50 outputs an imaging signal having a predetermined pixel size (for example, 2560×1920 pixels) obtained by using the inner area of the use range 104 of the CCD 32, to the color process circuit 41 via the CDS/ADC block 33, and goes to step S8-1-6 (step S8-1-3).

In a case where the camera shake correction function is turned off, the control unit 50 exposes the CCD 32 according to the shooting conditions such as the shutter speed, etc. obtained at step S8-1-1, while fixing the CCD base 31 (i.e., the CCD 32) at the center position (step S8-1-4). Further, the control unit 50 outputs an imaging signal of an image having a predetermined size (for example, 3200×2400 pixels) obtained with the use of the full area of the CCD 32, to the color process circuit 41 via the CDS/ADC block 33, and goes to step S8-1-6 (step S8-1-5).

The color process circuit 41 applies a color process for performing pixel interpolation to the imaging signal input thereto, and performs a YUV conversion process to generate a luminance signal (Y) and color difference signals (Cb, Cr) having digital values. The control unit 50 enlarges or reduces this processed data in accordance with the image size defined at step S8-1-3 or step S8-1-5, and goes to step S9 of FIG. 4 (step S8-1-6)

By the operations shown in the flowcharts of FIG. 5 and FIG. 6, the digital camera 1 changes the use range of the CCD 32 at the time of through image display and at the time of still image shooting (during the exposure of the still image), in accordance with whether the camera shake correction function is turned on or off. Therefore, the digital camera 1 is able to use a CCD having a size corresponding to its lens size. Further, since the pixels within an effective area are used for the camera shake correction process, an image which is not affected by over exposure can be obtained. In a case where the camera shake correction process is not performed, an image having high resolutions can be obtained with the use of the full area of the CCD 32.

Embodiment 2

According to the above-described embodiment 1, the user arbitrarily sets the camera shake correction function while a through image is displayed. On the other hand, the amount of camera shake depends on the zooming magnification and the shutter speed attributed to the relationship between the brightness of the photo object and the CCD sensitivity. That is, generally, if the photo object is sufficiently bright and shot at a wide angle, there is little need of caring about the camera shake. Hence, it is also possible to design to automatically determine the necessity for camera shake correction (henceforth, this determination of whether or not a camera shake correction is necessary will be called "necessity determination".) in accordance with the shooting conditions such as zooming magnification, shutter speed, etc., instead of manually setting the camera shake correction function to be turned on or off. Accordingly, it is possible to determine whether camera shake correction is necessary or not, based on the above-described shooting conditions at the time of through image display and at the time of still image shooting, and to determine which part of the CCD area should be used.

Figure 7:
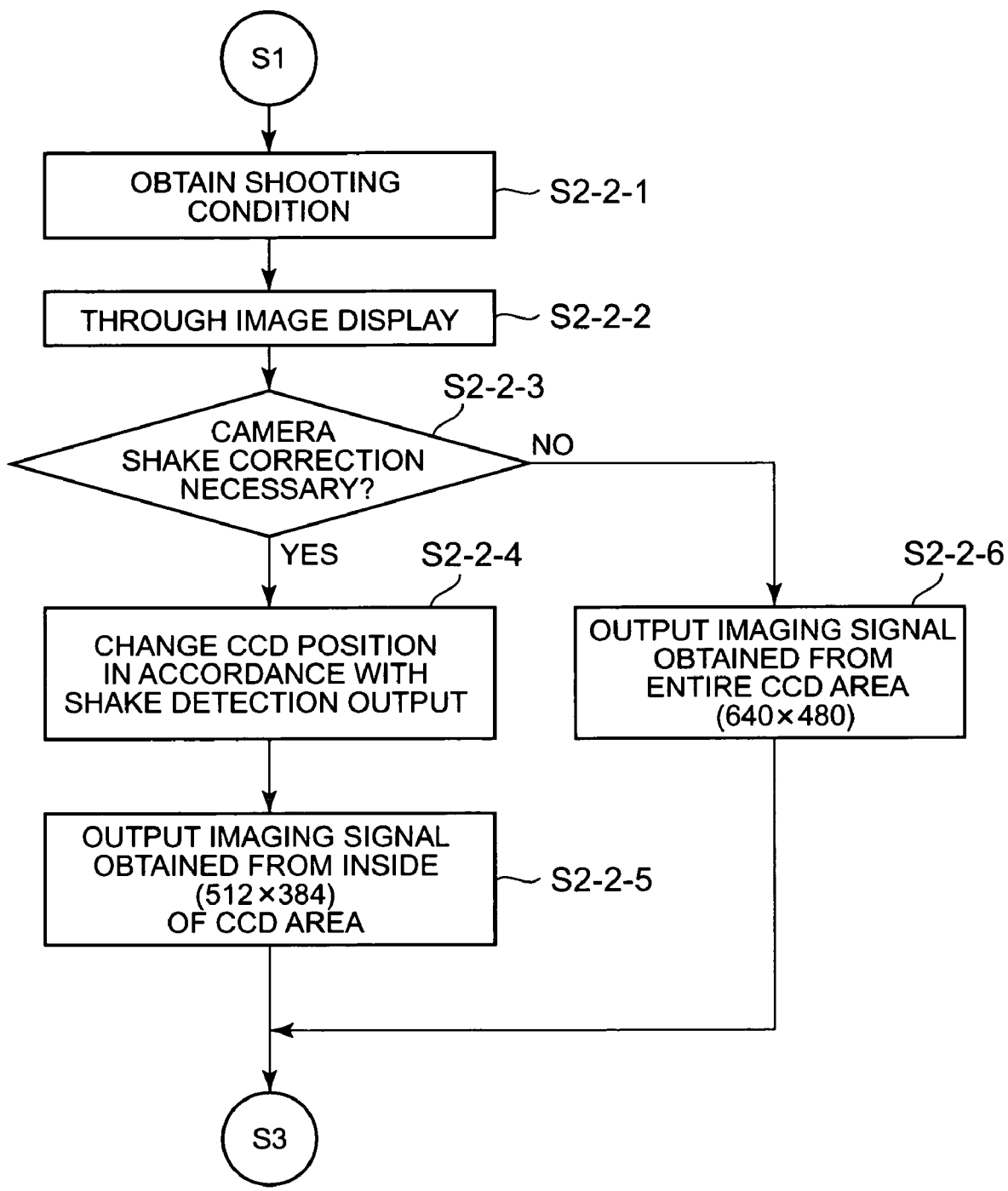
FIG. 7 is a flowchart showing one embodiment of a camera shake correction process at the time of through image display according to an embodiment 2.

The present embodiment shows a case that a camera shake correction process (FIG. 7) based on the necessity determination for camera shake correction according to the shooting conditions at the time of through image display is performed at step S2 in the flowchart of FIG. 4. It also shows a case that a camera shake correction process (FIG. 8) based on the necessity determination for camera shake correction according to the shooting conditions is performed at step S8 of FIG. 4. FIG. 7 is a flowchart showing one embodiment of a camera shake correction process at the time of through image display according to the present embodiment, and shows a detailed flowchart of step S2 of FIG. 4. The following explanation will be given based on FIGS. 1 to 4 and FIG. 7.

In FIG. 7, the control unit 50 obtains the zoom position information, the shooting conditions such as shutter speed, etc. at that time (step S2-2-1). The control unit 50 performs an AE process for the through image at the focal length corresponding to the obtained zoom position. Then, the color process circuit 41 applies a white balance (AWB) process to image data obtained from the CCD 32. The control unit 50 starts transferring the processed result to the work memory 60. Simultaneously, the control unit 50 sends the processed result to the liquid crystal monitor screen 4 of the image display unit 70 and starts through image display. The shutter speed obtained at step S2-2-1 may be a value manually set by the user, or a value automatically set based on the brightness of the image signal acquired by the CCD 32 for through image display (step S2-2-2).

The control unit 50 obtains a zooming magnification from the zoom position information obtained at step S2-2-1. The control unit 50 determines whether camera shake correction is necessary or not based on the zooming magnification and the shutter speed obtained at step S2-2-1. In a case where camera shake correction is necessary, the flow goes to step S2-2-4. Otherwise, the flow goes to step S2-2-6. In determining the necessity for camera shake correction, for example, whether or not the brightness of the photo object is equal to or greater than a predetermined value is evaluated, based on the shutter speed obtained at step S2-2-1. Further, it may be determined whether the photo object is shot at a wide angle based on the zoom position obtained at step S2-2-1. Based on the results of these determinations, in a case where the brightness of the photo object is equal to, or greater than a predetermined value and where the photo object is shot at a wide angle, camera shake correction is determined to be unnecessary, and otherwise, camera shake correction is determined to be necessary (step S2-2-3).

In a case where camera shake correction is determined to be necessary at step S2-2-3, the control unit 50 generates a drive signal to be sent to the CCD shift driver 55 in accordance with a shake detection value received from the pose sensor 65. CCD shift driver 55 moves, the position of the CCD base 31 (i.e., the CCD 32) in the X direction and the Y direction perpendicular to the optical axis of the lenses within the CCD movable range 102. Then, the flow goes to step S2-2-5 (step S2-2-4).

Next, the control unit 50 outputs an imaging signal obtained with the use of the inner area of the use range 104 of the CCD 32 to the color process circuit 41 via the CDS/ADC 33, and goes to step S3 of FIG. 4. Since pixel merging or pixel decimation is performed at the time of through image display, the image size is set to a smaller size (for example, 512×384 pixels) than that at the time of still image shooting (step S2-2-5).

In a case where it is determined at step S2-2-3 that camera shake correction is not to be performed, the control unit 50 fixes the CCD base 31 (i.e., the CCD 32) at the center position, sets the use range such that the entire area of the CCD 32 is used, outputs an imaging signal to the color process circuit 41 via the CDS/ADC block 33, and goes to step S3 of FIG. 4. Also in this case, since pixel merging or pixel decimation is performed at the time of through image display, the image size is set to a smaller size (for example, 640×480 pixels) than that at the time of still image shooting (step S2-2-6).

The image signal output at step S2-2-5 or at step S2-2-6 is displayed at step S2-2-2 as a through image. In a case where the zooming magnification is changed at step S3, the zooming magnification after the change is obtained at step S2-2-1 described above.

Figure 8:
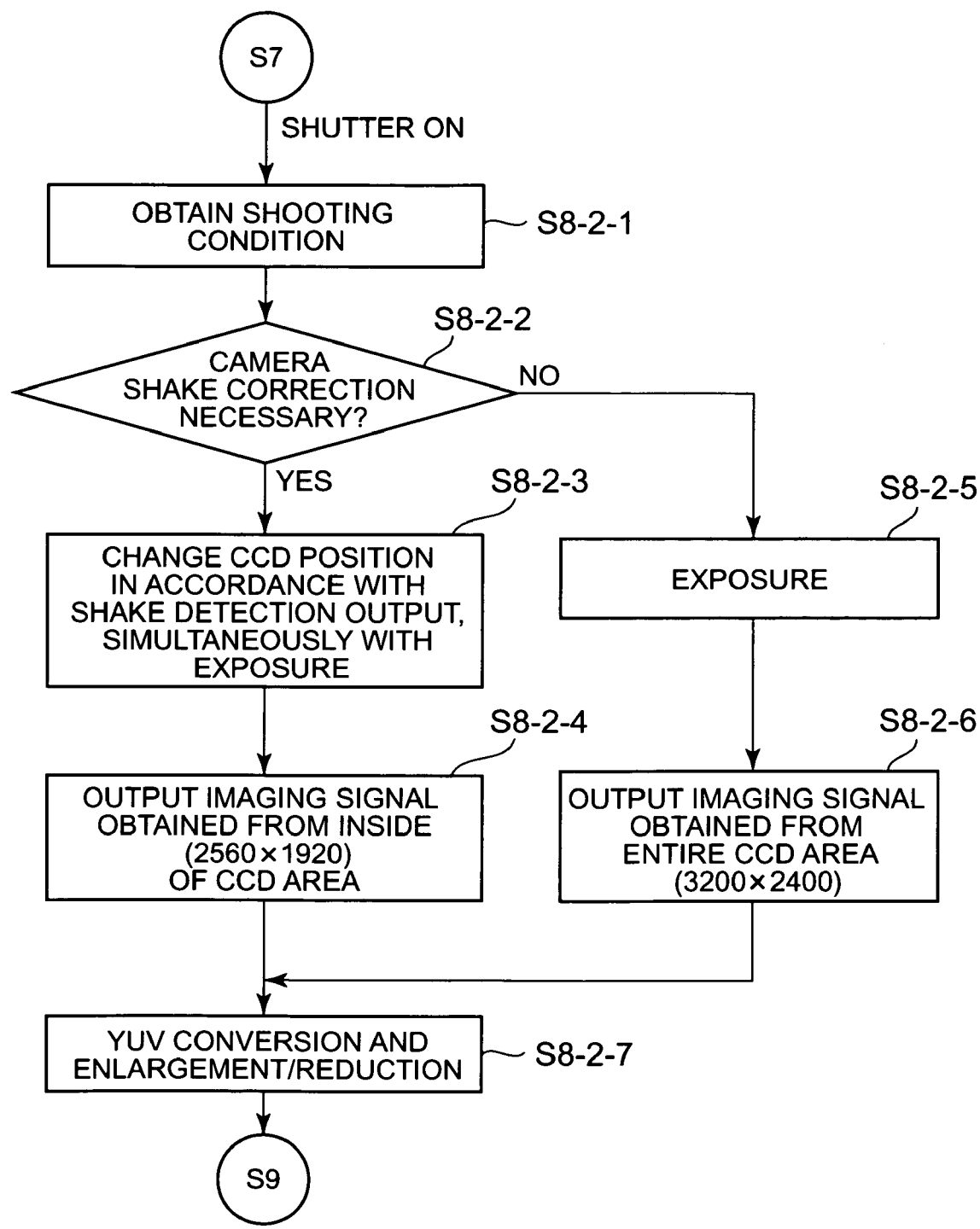
FIG. 8 is a flowchart showing one embodiment of a camera shake correction process at the time of still image shooting according to the embodiment 2.

FIG. 8 is a flowchart showing one embodiment of a camera shake correction process at the time of still image shooting according to the present embodiment, and shows a detailed flowchart of step S8 of FIG. 4. The following explanation will be given based on FIGS. 1 to 4, and FIG. 8.

In a case where it is determined at step S7 of FIG. 4 that the shutter key 8 is fully pressed, the control unit 50 obtains the zoom position and the shooting conditions such as shutter speed, etc. at that time (step S8-2-1). The control unit 50 determines whether camera shake correction is necessary or not based on the obtained shutter speed and zooming magnification. In a case where camera shake correction is necessary, the flow goes to step S8-2-3. Otherwise, the flow goes to step S8-2-5. Whether camera shake correction is necessary or not can be determined in the same manner as that of step S2-2-3 of FIG. 7 (step S8-2-2).

In a case where it is determined at step S8-2-2 that camera shake correction is necessary, the control unit 50 exposes the CCD 32 in accordance with the shooting conditions such as shutter speed, etc. obtained at step S8-2-1. Simultaneously, during the exposure, the control unit 50 generates a drive signal to be sent to the CCD shift driver 55 in accordance with a shake detection value received from the pose sensor 65. CCD shift driver 55 moves, the position of the CCD base 31 (i.e., the CCD 32) in the X direction and the Y direction perpendicular to the optical axis of the lenses within the CCD movable range 102 (step S8-2-3).

Next, the control unit 50 outputs an imaging signal of an image having a predetermined size (for example, 2560×1920 pixels) obtained using the inner area of the use range of the CCD 32, to the color process circuit 41 via the CDS/ADC block 33, and goes to step S8-2-7 (step S8-2-4).

In a case where it is determined at step S8-2-2 that camera shake correction is not to be performed, the control unit 50 exposes the CCD 32 in accordance with the shooting conditions such as shutter speed, etc. obtained at step S8-2-1 while fixing the CCD base 31 (i.e., the CCD 32) is fixed at the center position (step S8-2-5). Further, the control unit 50 outputs an imaging signal of an image having a predetermined size (for example, 3200×2400 pixels) obtained using the entire area of the CCD 32 to the color process circuit 41 via the CDS/ADC block 33, and goes to step S8-2-7 (step S8-2-6).

The color process circuit 41 applies a color process for performing pixel interpolation to the imaging signal input thereto, and performs a YUV conversion process in order to generate a luminance signal (Y) and color difference signals (Cb, Cr) having digital values. The control unit 50 enlarges or reduces the data carried on the generates signals in accordance with the image size defined at step S8-2-4 or at step S8-2-6, and goes to step S9 of FIG. 4 (step S8-2-7).

By the operations shown in the flowcharts of FIG. 7 and FIG. 8, the digital camera 1 determines whether camera shake correction is necessary or not based on the shooting conditions such as zooming magnification, shutter speed, etc. In accordance with the result of the determination, the use range within the CCD 32 is changed at the time of through image display and at the time of still image shooting (during the exposure of the still image). Accordingly, the digital camera 1 is able to use a CCD having a size corresponding to its lens size. Since the pixels within an effective area are used in the camera shake correction process, an image which is not affected by over exposure can be obtained. Further, in a case where the camera shake correction process is not performed, it is possible to obtain an image having a high resolution, with the use of the full area of the CCD 32. Furthermore, since camera shake correction may be turned on/off by automatic determination, the user's workload can be reduced.

Embodiment 3

Figure 9:
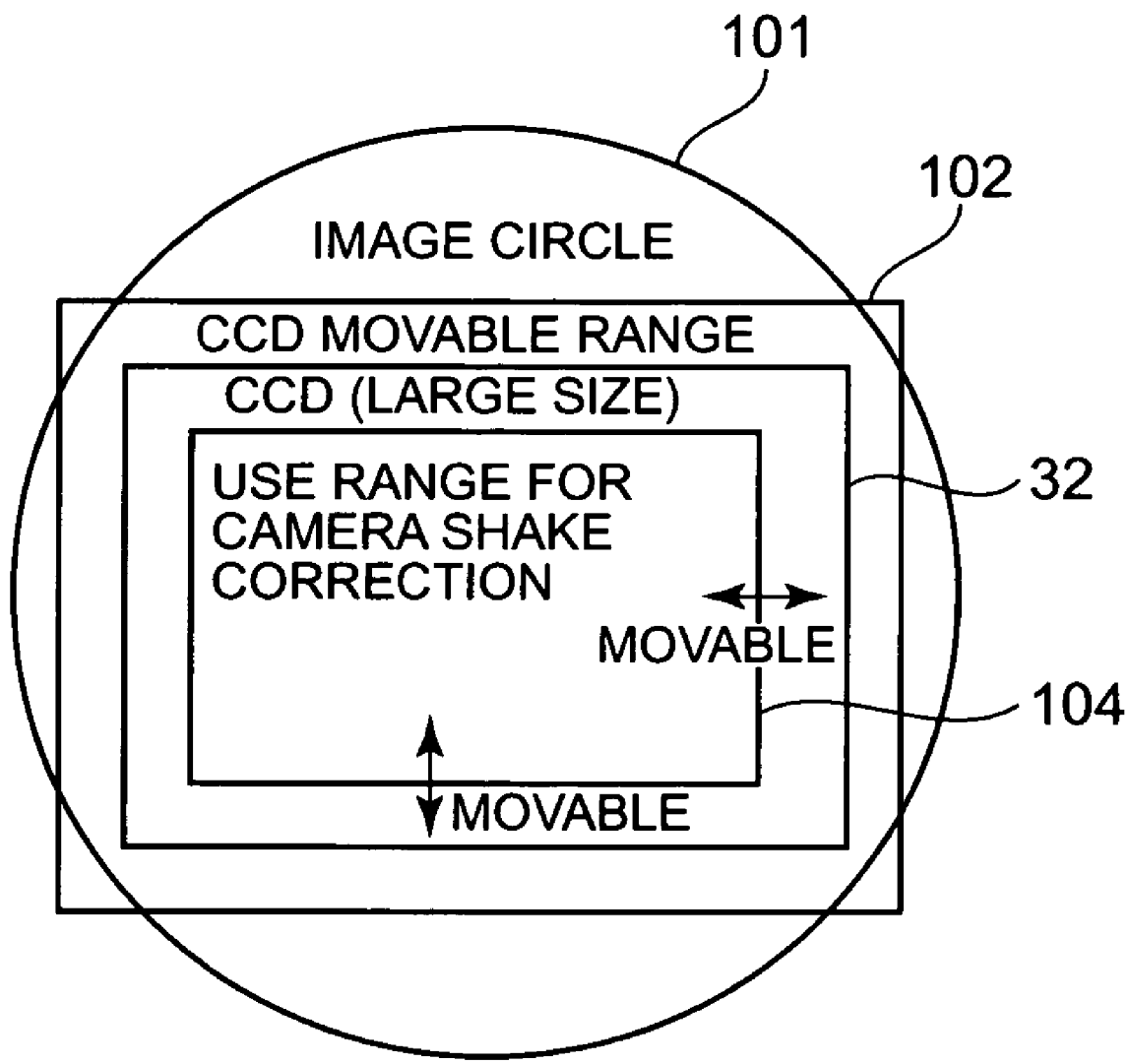
FIG. 9 is an explanatory diagram of a use range of a CCD for camera shake correction, which changes in accordance with a zoom position.

According to the above-described embodiment 2, it is automatically determined whether or not camera shake correction is necessary in accordance with the shooting conditions such as zooming magnification, shutter speed, etc., and which part of the CCD area is to be used. On the other hand, since the amount of camera shake increases as the camera zooms from the widest angle to a telescopic angle, it is possible to estimate the maximum value of the amount of camera shake based on the zoom position. Accordingly, it is possible to determine the use range (range of extraction) for camera shake correction at the center of the CCD area in accordance with the zoom position. That is, as shown in FIG. 9, the size of the use range 104 within the CCD 32 at the time of camera shake correction can be changed in accordance with the zoom position (the use range 104 increases or decreases in accordance with the zoom position).

Figure 10:
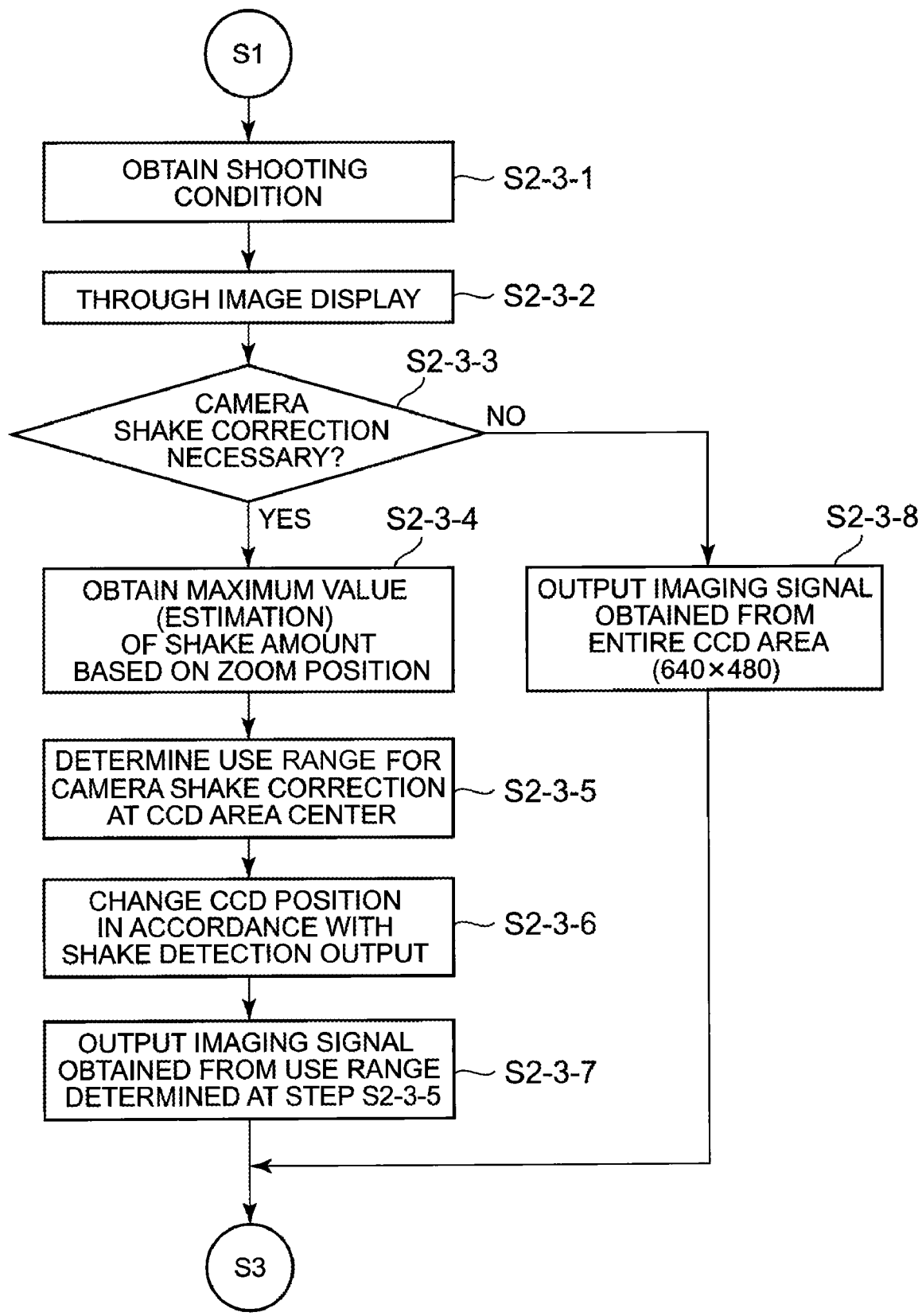
FIG. 10 is a flowchart showing one embodiment of a camera shake correction process at the time of through image display according to an embodiment 3.

The present embodiment shows a case that a camera shake correction process (FIG. 10) based on the necessity determination for camera shake correction in consideration of the shooting conditions at the time of through image display is performed at step S2 in the flowchart of FIG. 4, and a case that a camera shake correction process (FIG. 11) based on the necessity determination for camera shake correction in consideration of the shooting conditions is performed at step S8 of FIG. 4. FIG. 10 is a flowchart showing one embodiment of a camera shake correction process at the time of through image display according to the present embodiment, and shows a detailed flowchart of step S2 of FIG. 4. The following explanation will be given based on FIGS. 1 to 4, FIG. 9, and FIG. 10.

In FIG. 10, the control unit 50 obtains zooming position information and shooing conditions such as shutter speed, etc. at that time (step S2-3-1). Then, the control unit 50 performs an AE process for a through image at the focal length corresponding to the obtained zoom position. The color process circuit 41 applies a white balance (AWB) process to image data obtained from the CCD 32. The control unit 50 starts transferring the process result to the work memory 60. Simultaneously, the control unit 50 sends the process result to the liquid crystal monitor screen 4 of the image display unit 70 to start through image display (step S2-3-2). The shutter speed obtained at step S2-3-1 may be a value manually set by the user, or may be a value automatically set based on the brightness of the image signal acquired by the CCD 32 for through image display.

The control unit 50 obtains a zooming magnification based on the zoom position information obtained at step S2-3-1. The necessity for camera shake correction is determined based on the zooming magnification and the shutter speed obtained at step S2-3-1. The flow goes to step S2-3-4 in a case where camera shake correction is necessary. Otherwise, the flow goes to step S2-3-8. Whether camera shake correction is necessary or not can be determined in the same manner as that at step S2-2-3 of FIG. 7 (step S2-3-3).

In a case where it is determined at step S2-3-3 that camera shake correction is necessary, the correction unit 50 calculates the maximum value of the amount of camera shake at the obtained zoom position based on the zoom position information obtained at step S2-3-1 in accordance with a predetermined calculation method. It is also possible to prepare beforehand a table associating zoom positions with estimated values of maximum values of the amount of camera shake (hereinafter the estimated values will be referred to as maximum estimation values), and register the table in a memory such as a program memory, etc, so that an estimation value is retrieved from the table in accordance with the zoom position. In a case where the obtained zoom position information indicates any zoom position other than the registered zoom positions, it is possible to calculate the maximum value of the amount of camera shake at that zoom position by performing interpolation based on the values registered on the table (step S2-3-4).

Next, the control unit 50 determines the use range for camera shake correction at the center of the CCD area based on the maximum estimation value of the amount of camera shake obtained at step S2-3-4, and goes to step S2-3-6 (step S2-3-5). Here, as the maximum estimation value of the amount of camera shake obtained at step S2-3-4 increases, the use range for the camera shake correction becomes smaller.

According to the present embodiment, the maximum estimation value of the amount of camera shake at the obtained zoom position is calculated at step S2-3-4 based on the zoom position information obtained at step S2-3-1, and the use range for the camera shake correction at the center of the CCD area is determined at step S2-3-5 based on the maximum estimation value of the amount of camera shake. However, step S2-3-4 may be omitted, so that the use range for camera shake correction at the center of the CCD area may be determined based directly on the zoom position information obtained at step S2-3-1.

Further, the control unit 50 performs the exposure of the CCD 32. Simultaneously, during the exposure, the control unit 50 generates a drive signal to be sent to the CCD shift driver 55 in accordance with a shake detection value received from the pose sensor 65. CCD shift driver 55 moves, the position of the CCD base 31 (i.e., the CCD 32) in the X direction and the Y direction perpendicular to the optical axis of the lenses within the CCD movable range 102. Then, the flow goes to step S2-3-7 (step S2-3-6).

Next, the control unit 50 outputs an imaging signal obtained with the use of the use range within the area of the CCD 32 that is determined at step S2-3-5 to the color process circuit 41 via the CDS/ADC block 33, and goes to step S3 of FIG. 4. Since pixel merging or pixel decimation is performed at the time of through image display, the image size is set to a smaller size (for example, 512×384 pixels) than that at the time of still image shooting (step S2-3-7).

In a case where it is determined at step S2-3-3 that camera shake correction is not to be performed, the control unit 50 exposes the CCD 32 while the CCD 31 (i.e., the CCD 32) is fixed at the center position, sets the use range such that the entire area of the CCD 32 will be used, and goes to step S3 of FIG. 4. Also in this case, since pixel merging or pixel decimation is performed at the time of through image display, the image size is set to a smaller size (for example, 640×480 pixels) than that at the time of still image shooting (step S2-3-8). The image signal output at step S2-3-7 or at step S2-3-8 is displayed as a through image at step S2-3-2. In a case where the zooming magnification is changed at step S3, the zooming magnification after the change is obtained at step S2-3-1.

Figure 11:
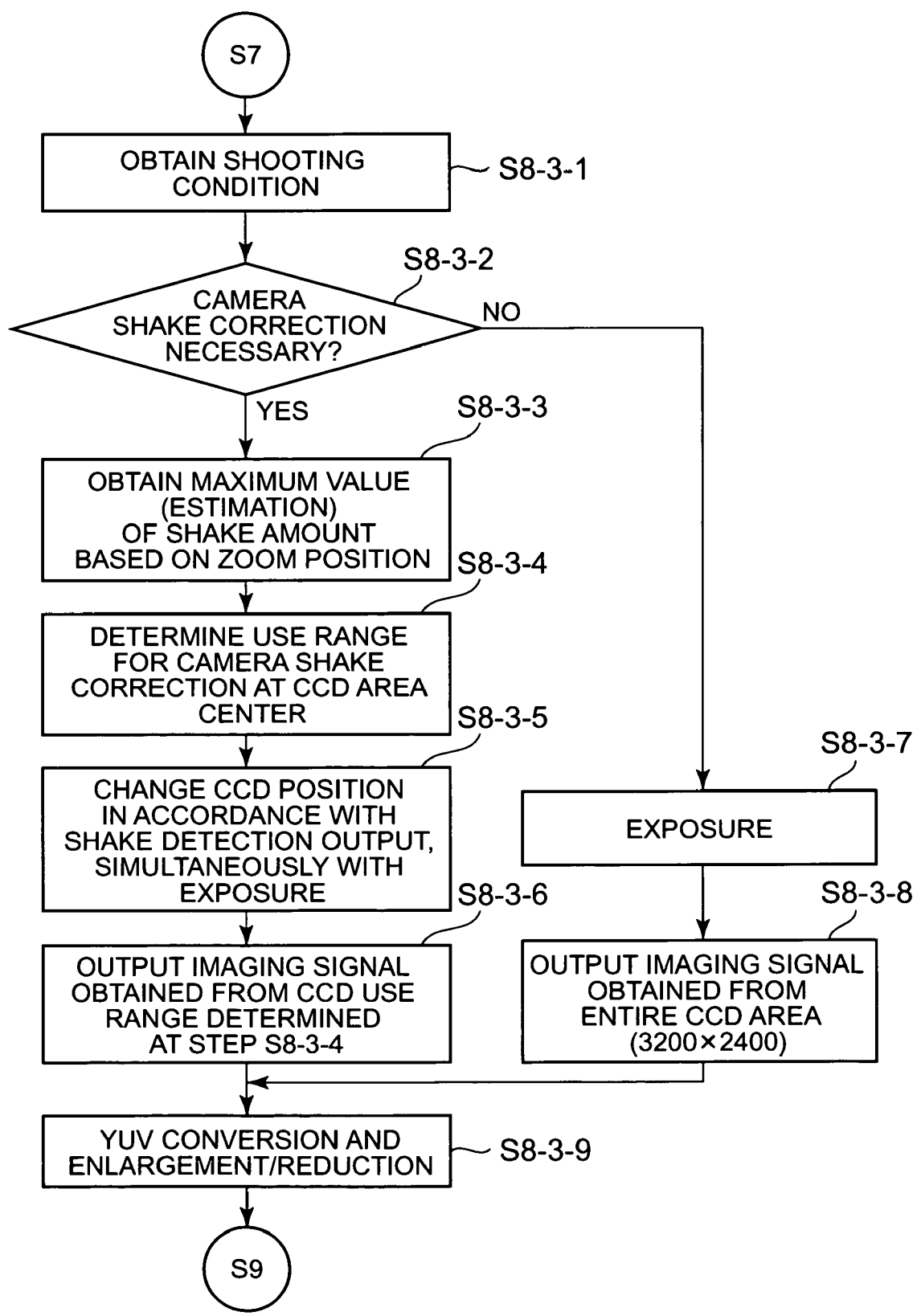
FIG. 11 is a flowchart showing one embodiment of a camera shake correction process at the time of still image shooting according to the embodiment 3.

FIG. 11 is a flowchart showing one embodiment of a camera shake correction process at the time of still image shooting according to the present embodiment, and shows a detailed flowchart of step S8 of FIG. 4. The following explanation will be given based on FIGS. 1 to 4, FIG. 9, and FIG. 11.

In a case where it is determined at step S7 of FIG. 4 that the shutter key 8 is fully pressed, the control unit 50 obtains the shooting conditions such as zoom position, shutter speed, etc. at that time (step S8-3-1). The control unit 50 determines whether or not camera shake correction is necessary based on the obtained shutter speed and zooming magnification. In a case where camera shake correction is necessary, the flow goes to step S8-3-3, and otherwise the flow goes to step S8-3-7. Whether camera shake correction is necessary or not can be determined in the same manner as that at step S2-2-3 of FIG. 7 (step S8-3-2).

In a case where it is determined at step S8-3-2 that camera shake correction is necessary, the control unit 50 calculates the maximum estimation value of the amount of camera shake at the obtained zoom position, based on the zoom position information obtained at step S8-3-1 in accordance with a predetermined calculation method. The maximum estimation value of the amount of camera shake can be calculated, for example, in the same manner as that at step S2-3-4 of FIG. 10 (step S8-3-3).

Next, the control unit 50 determines the use range for camera shake correction at the center of the CCD area based on the maximum estimation value of the amount of camera shake obtained at step S8-3-3, and goes to step S8-3-5. Here, as the maximum estimation value of the amount of camera shake obtained at step S8-3-3 increases, the use range for the camera shake correction becomes smaller (step S8-3-4).

The control unit 50 performs the exposure the CCD 32 in accordance with the shooting conditions such as shutter speed, etc. obtained at step S8-3-1. Simultaneously, during the exposure, the control unit 50 generates a drive signal to be sent to the CCD shift driver 55 in accordance with a shake detection value received from the pose sensor 65. CCD shift driver 55 moves, the position of the CCD base 31 (i.e., the CCd 32) in the direction and the Y direction perpendicular to the optical axis of the lenses within the CCD movable range 102 (step S8-3-5).

The control unit 50 outputs an imaging signal obtained with the use of the use range within the CCD area that is determined at step S8-3-4 to the color process circuit 41 via the CDS/ADC block 33, and goes to step S8-3-9 (step S8-3-6).

In a case where it is determined at step S8-3-2 that camera shake correction is not to be performed, the control unit 50 exposes the CCD 32 in accordance with the shooting conditions such as shutter speed, etc. obtained at step S8-3-1, while the CCD 31 (i.e., the CCD 32) is fixed at the center position (step S8-3-7). Further, the control unit 50 outputs an imaging signal of an image having a predetermined size (for example, 3200×2400 pixels) obtained with the use of the entire area of the CCD 32 to the color process circuit 41 via the CDS/ADC block 33, and goes to step S8-3-9 (step S8-3-8).

The color process circuit 41 applies a color process for performing pixel interpolation to the imaging signal input thereto, and performs a YUV conversion process in order to generate a luminance signal (Y) and color difference signals (Cb, Cr) having digital values. The control unit 50 enlarges or reduces the data carried on the generated signals in accordance with the image size defined at step S8-3-6 or at step S8-3-8, and goes to step S9 of FIG. 4 (step S8-3-9).

According to the present embodiment, the maximum estimation value of the amount of camera shake at the obtained zoom position is calculated at step S8-3-3 based on the zoom position information obtained at step S8-3-1, and the use range for camera shake correction at the center of the CCD area is determined at step S8-3-4 based on the maximum estimation value of the amount of camera shake. However, step S8-3-3 may be omitted so that the use range for camera shake correction at the center of the CCD area may be determined based directly on the zoom position information obtained at step S8-3-1.

By the operations shown in the flowcharts of FIG. 10 and FIG. 11, likewise in the above-described embodiment 2, the digital camera 1 can use a CCD having a size corresponding to its lens size. It is possible to obtain an image which is not affected by over exposure, while using the pixels within as large an effective area as possible for camera shake correction. Further, it is possible to obtain an image having a high resolution, by using the entire area of the CCD 32 in a case where the camera shake correction process is not performed. Further, necessity and unnecessity for camera shake correction can be switched by automatic determination. Therefore, the user's workload can be reduced, and an image having a higher resolution can be obtained even when camera shake correction is performed.

In the flowcharts of FIG. 10 and FIG. 11, whether camera shake correction is necessary or not is automatically determined by obtaining the shooting conditions. However, the user may turn on or off the camera shake correction function manually. For example, step S2-3-1 of FIG. 10 may be designed such that "the control unit 50 checks a signal from the key circuit 95, and turns on the camera shake correction function in a case where the key 10 is pressed", step S2-3-3 of FIG. 10 may be designed such that "in a case where the camera shake correction function is turned on, the flow goes to step S2-3-4, and otherwise, the flow goes to step S2-3-8", and step S8-3-2 of FIG. 11 may be designed such that "in a case where the camera shake correction function is turned on, the flow goes to step S8-3-3, and otherwise, the flow goes to step S8-3-7".

Embodiment 4

The use range (use range 106 for camera shake correction shown in FIG. 12) within the CCD 32 used in the embodiment 1 to embodiment 3 described above is positioned at the center of the CCD 32. However, according to the present embodiment, the use range is determined in conjunction with the trajectory at the time of camera shake correction. That is, the trajectory of the CCD base 31 when the camera shake correction is performed, is obtained, in order to find how much the CCD base 31 has gone beyond the image circle 101 during a period from an exposure start time to an exposure end time.

Figure 12:
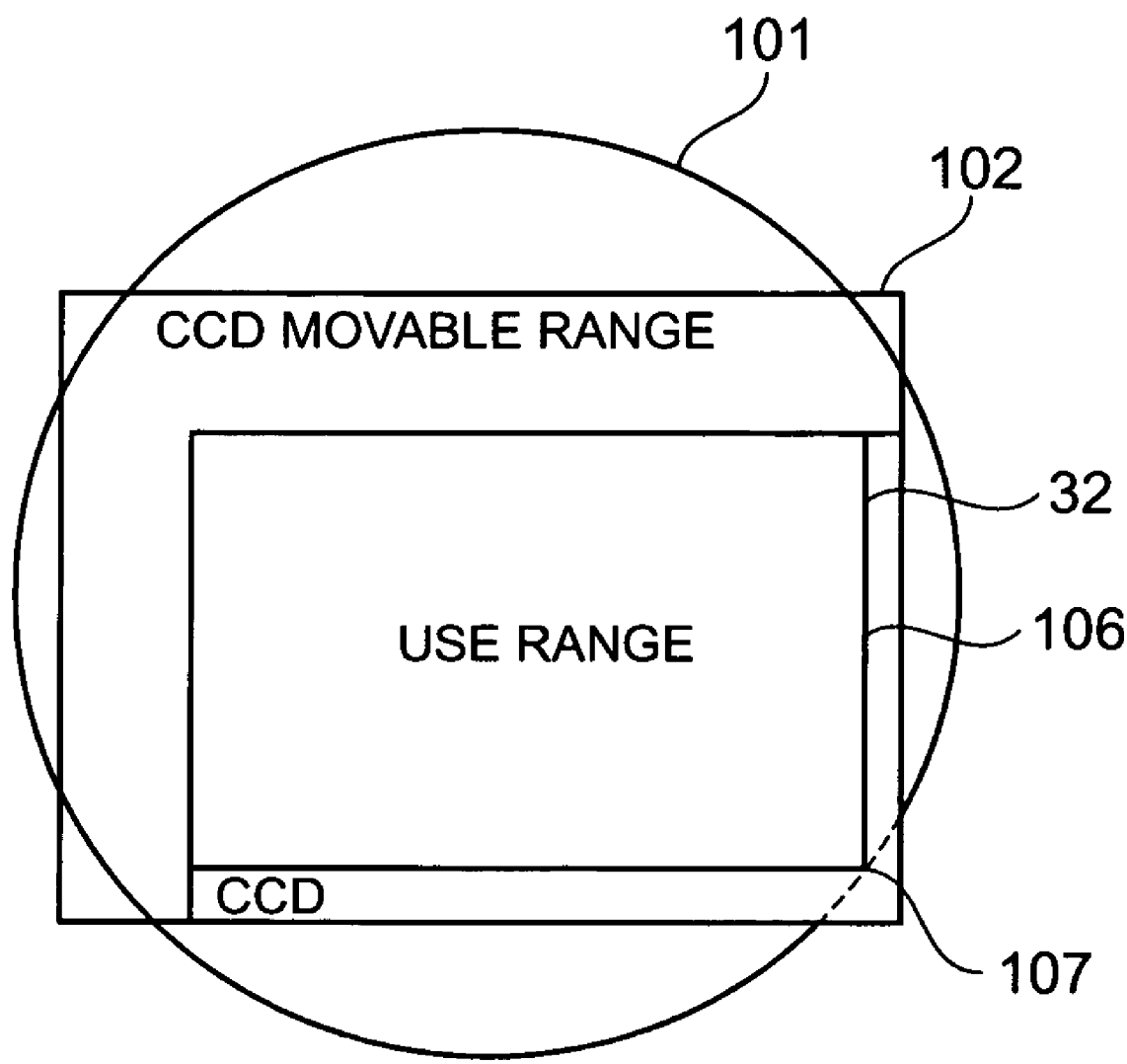
FIG. 12 is an explanatory diagram of a use range of a CCD for camera shake correction, which is used in conjunction with a trajectory of camera shake correction.

FIG. 12 is an explanatory diagram of the use range within the CCD 32 for camera shake correction that is used in conjunction with the trajectory of camera shake correction, and shows one example of a use range 106 in a case where the CCD 32 is moved to the lower right within the CCD movable range 102. As shown in FIG. 12, such a point 107 on the image circle 101 is obtained, that will make the use range 106 the largest when the CCD 32 goes beyond the image circle 101. Based on this, the use range 106 can be determined.

Figure 13:
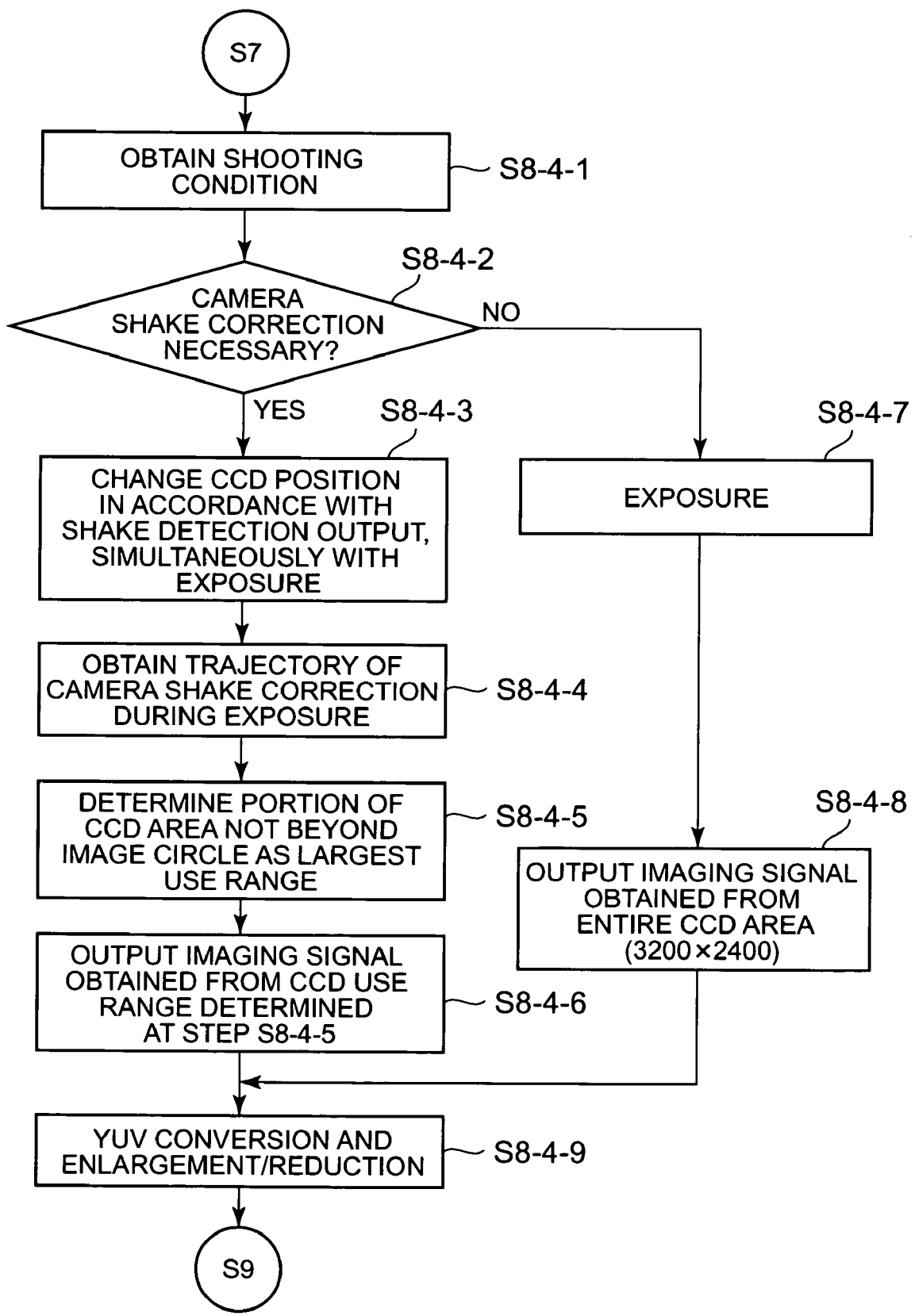
FIG. 13 is a flowchart showing one embodiment of a camera shake correction process at the time of still image shooting according to an embodiment 4.
Figure 14A:
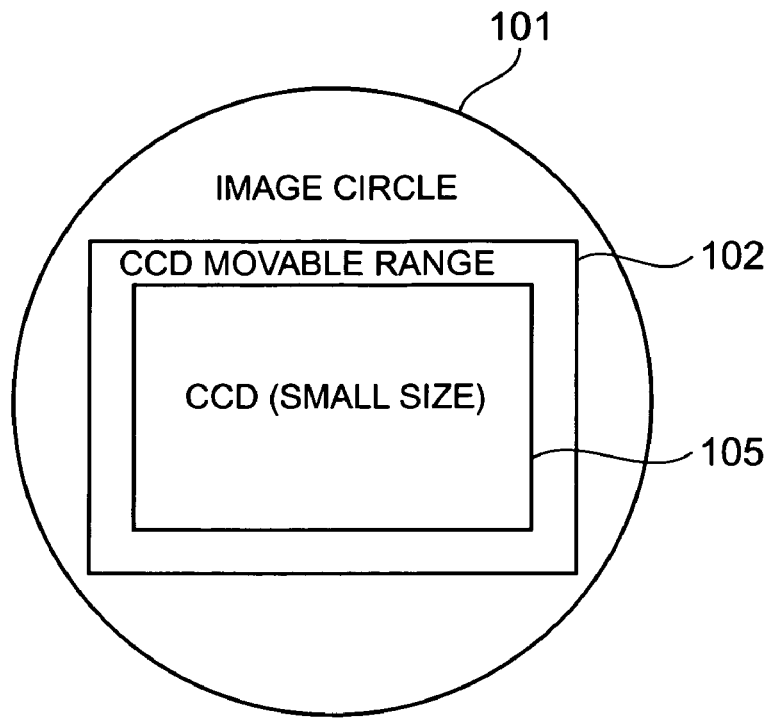
FIG. 14A is an explanatory diagram showing a relationship between an image circle and a CCD in camera shake correction according to a conventional CCD sensor shifting method.
Figure 14B:
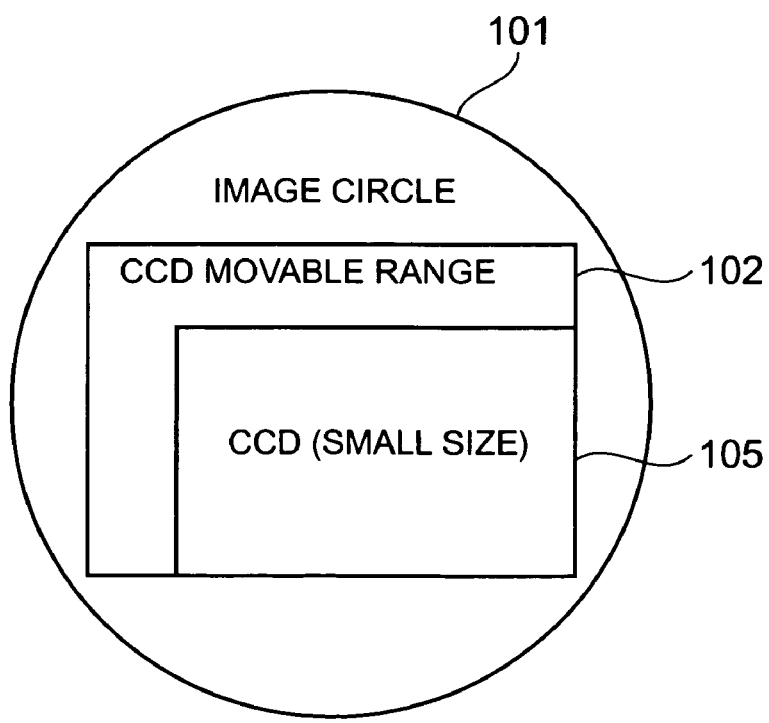
FIG. 14B is an explanatory diagram showing a relationship between an image circle and a CCD in camera shake correction according to the conventional CCD sensor shifting method.

FIG. 13 is a flowchart showing one embodiment of a camera shake correction process at the time of still image shooting according to the embodiment 4, and shows a detailed flowchart of step S8 of FIG. 4. The following explanation will be given based on FIGS. 1 to 4, FIG. 12, and FIG. 13.

In a case where it is determined at step S7 of FIG. 4 that the shutter key 8 is fully pressed, the control unit 50 obtains the shooting conditions such as zoom position, shutter speed at that time (step S8-4-1). The control unit 50 determines whether or not camera shake correction is necessary based on the obtained shutter speed and zooming magnification. In a case where camera shake correction is necessary, the flow goes to step S8-4-3, and otherwise, the flow goes to step S8-4-7. Whether camera shake correction is necessary or not can be determined in the same manner as that at step S2-2-3 of FIG. 7 (step S8-4-2).

In a case where it is determined at step S8-4-2 that camera shake correction is necessary, the control unit 50 exposes the CCD 32 in accordance with the shooting conditions such as shutter speed, etc. obtained at step S8-4-1. Simultaneously, during the exposure, the control unit 50 generates a drive signal to be sent to the CCD shift driver 55 in accordance with a shake detection value received from the pose sensor 65. CCD shift driver 55 moves, the position of the CCD base 31 (i.e., the CCD 32) in the X direction and the Y direction perpendicular to the optical axis of the lenses within the CCD movable range 102 (step S8-4-3).

The control unit 50 obtains the trajectory of camera shake correction during exposure, i.e., the position of the center point of the CCD base 31 (=the center point of the CCD area) which is moved at step S8-4-3, in order to check how much the CCD 32 has gone beyond the image circle 101 during a period between the exposure start time and the exposure end time (step S8-4-4). In a case where the CCD 32 has not gone beyond the image circle 101, the entire area of the CCD 32 is determined as the use range 106. In a case where the CCD 32 has gone beyond the image circle 101, the control unit 50 finds a point 107 on the image circle 101 that will make the use range 106 the largest. The point 107 can be calculated as the point at which the distance between the center point of the CCD base 31 and the circumference of the image circle 101 becomes the shortest. (step S8-4-5).

The control unit 50 outputs an imaging signal obtained with the use of the use range 106 within the CCD area that is determined at step S8-4-5 to the color process circuit 41 via the CDS/ADC block 33, and goes to step S8-4-9 (step 8-4-6).

In a case where it is determined at step S8-4-2 that camera shake correction is not to be performed, the control unit 50 exposes the CCD 32 in accordance with the shooting conditions such as shutter speed, etc. obtained at step S8-4-1, while the CCD base 31 (i.e., the CCD 32) is fixed at the center position (step S8-4-7). Further, the control unit 50 outputs an imaging signal of an image, having a predetermined size (for example, 3200×2400 pixels) that is obtained with the use of the entire area of the CCD 32 to the color process circuit 41 via the CDS/ADC block 33, and goes to step S8-4-9 (step S8-4-8).

The color process circuit 41 applies a color process for performing pixel interpolation to the imaging signal input thereto, and generates a luminance signal (Y) and color difference signals (Cb, Cr) having digital values by performing YUV conversion. The control unit 50 enlarges or reduces this processed data in accordance with the image size defined at step S8-4-6 or at step S8-4-8, and goes to step S9 of FIG. 4 (step S8-4-9).

By the operation shown in the flowchart of FIG. 13, likewise the embodiment 2 and embodiment 3 described above, the digital camera 1 can use a CCD having a size corresponding to its lens size. It is possible to obtain an image which is not affected by over exposure, while using the pixels within as large an effective area as possible for camera shake correction. Further, it is possible to obtain an image having a high resolution, by using the entire area of the CCD 32 in a case where the camera shake correction process is not performed. Furthermore, camera shake correction can be switched on/off by automatic determination. Accordingly, the user's workload can be educed, and an image having the highest resolution possible can be obtained even when camera shake correction is performed.

In the flowchart of FIG. 13, whether camera shake correction is necessary or not is automatically determined by obtaining the shooting conditions. However, the user may turn on the camera shake correction function manually. For example, a step that "the control unit 50 checks a signal from the key circuit 95, and turns on the camera shake correction function in a case where the key 10 is pressed" may be inserted at step S2 of FIG. 4, and step S8-4-2 of FIG. 13 may be designed such that "in a case where the camera shake correction function is turned on, the flow goes to step S8-4-3, and otherwise, the flow goes to step S8-4-7".

In the explanation of the respective embodiments (see the flowcharts shown in FIG. 5 to FIG. 8, FIG. 10, FIG. 11, and FIG. 13), an imaging signal which is obtained by using the entire area of the CCD 32 is used in a case where camera shake correction is not performed. However, the entire area of the CCD 32 may not necessarily be used, so long as a use range larger than those when a camera shake correction is performed, is used.

In the above-described embodiments, the explanation has been given by employing, as an example, a case where camera shake correction is performed at the time of through image display and at the time of still image shooting. However, the application of the present invention is not limited to the case of through image display and the case of still image shooting, but can be applied to a case of moving image shooting. Further, the present invention is not limited to a digital camera, but, needless to say, can be modified in various manners. For example, the present invention can be applied to portable phones with a camera, and to information apparatuses having an imaging element, etc.

Some embodiments of the present invention have been explained, but the present invention is not limited to the very embodiments described above. When the present invention is carried out, the structural elements thereof may be modified and materialized within the scope of the idea of the invention. Further, various inventions can be built by appropriately combining a plurality of structural elements disclosed in the embodiments described above. For example, some structural elements may be omitted, from the structural elements shown in the embodiments.

Further, in the above-described embodiments, a case has been explained, where the present invention is applied to performing camera shake correction by moving the CCD 32. However, the present invention is not limited to this case. For example, the present invention can also be applied to performing camera shake correction by moving the imaging lenses 2 as the optical system. That is, the present invention can be applied to performing camera shake correction by changing the relative positions of the imaging element and the optical system.

The method described in the above-described embodiments can be applied to various apparatuses in the form of a program executable by a computer. For example, a program for realizing this method may be written on a recording medium such as a flash memory, a hard disk, a detachable memory card, etc. and be applied to various apparatuses. Alternatively, the program itself may be transmitted via a transmission medium such as a network, etc., and be applied to various apparatuses. Computers of various types may read the program recorded on a recording medium or the program provided via a transmission medium. By this read program controlling the operations, the respective processes are performed and the present method is realized.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-266266 filed on Sep. 14, 2005 and including specification, claims, drawings and summary. The disclosure of the above Japanese Patent Application is incorporated herein by reference in its entirety.

What is claimed is:

1. An imaging apparatus, comprising:
an imaging element which opto-electrically converts an image formed by an optical system and outputs an imaging signal;
a shake detection unit which detects a shake of the apparatus and outputs a shake detection signal;
a shake correction unit which performs camera shake correction by changing relative positions of the imaging element and the optical system based on the shake detection signal from the shake detection unit;
a shake correction necessity determining unit which determines whether the shake correction should be performed by the shake correction unit; and
a control unit which processes an imaging signal read out from a predefined first specific area of the imaging element when the shake correction necessity determining unit determines that the shake correction is to be performed, and which processes an imaging signal read out from a second specific area of the imaging element that is larger than the first specific area and that includes the first specific area when the shake correction necessity determining unit determines that the shake correction is not to be performed.

2. The imaging apparatus according to claim 1, further comprising an imaging signal process unit which processes the imaging signal read out from the imaging element,
wherein the control unit includes a unit which: (i) controls the imaging signal process unit to process the imaging signal read out from the predefined first specific area of the imaging element when the shake correction necessity determining unit determines that the shake correction is to be performed, and (ii) controls the imaging signal process unit to process the imaging signal read out from the second specific area of the imaging element larger than the first specific area and including the first specific area when the shake correction necessity determining unit determines that the shake correction is not to be performed.

3. The imaging apparatus according to claim 2, wherein the imaging signal process unit includes an imaging signal display process unit which performs a process for displaying the imaging signal read out from the imaging element.

4. The imaging apparatus according to claim 2, wherein the imaging signal process unit includes an imaging signal recording process unit which performs a process for recording the imaging signal read out from the imaging element.

5. The imaging apparatus according to claim 1, further comprising a reading range switching unit which switches reading ranges of the imaging element from which an imaging signal is read out,
wherein the control unit includes a unit which: (i) controls the reading range switching unit such that the imaging signal is read out from the predefined first specific area of the imaging element when the shake correction necessity determining unit determines that the shake correction is to be performed, and (ii) controls the reading range switching unit such that the imaging signal is read out from the second specific area of the imaging element larger than the first specific area and including the first specific area when the shake correction necessity determining unit determines that the shake correction is not to be performed.

6. The imaging apparatus according to claim 1, wherein a center position of the first specific area coincides with a center position of an entire area of the imaging element, and wherein the second specific area is the entire area of the imaging element.

7. The imaging apparatus according to claim 1, further comprising a shooting condition obtaining unit which obtains a predetermined shooting condition,
wherein the shake correction necessity determining unit determines whether it is necessary to perform the shake correction based on the shooting condition obtained by the shooting condition obtaining unit.

8. The imaging apparatus according to claim 7, wherein the predetermined shooting condition includes a zooming magnification.

9. The imaging apparatus according to claim 7, wherein the predetermined shooting condition includes a shutter speed.

10. The imaging apparatus according to claim 1, further comprising a shooting condition obtaining unit which obtains a predetermined shooting condition,
wherein the control unit includes a unit which changes the first specific area of the imaging element based on the shooting condition obtained by the shooting condition obtaining unit, when the shake correction necessity determining unit determines that the shake correction is to be performed.

11. The imaging apparatus according to claim 10, wherein the predetermined shooting condition includes a zooming magnification.

12. The imaging apparatus according to claim 10, wherein the predetermined shooting condition includes a shutter speed.

13. The imaging apparatus according to claim 1, wherein the shake correction unit performs the shake correction by moving the imaging element based on the shake detection signal from the shake detection unit.

14. The imaging apparatus according to claim 13, further comprising a move position obtaining unit which obtains a position of the imaging element moved by the shake correction based on the shake detection signal from the shake detection unit,
wherein the control unit includes a unit which changes the first specific area of the imaging element based on the position of the imaging element obtained by the move position obtaining unit, when the shake correction necessity determining unit determines that the shake correction is to be performed.

15. A data extraction method, involving use of: (i) an imaging element which opto-electrically converts an image formed by an optical system and outputs an imaging signal; (ii) a shake detection unit which detects a shake of an apparatus housing the shake detection unit and outputs a shake detection signal; and (iii) a shake correction unit which performs shake correction by changing relative positions of the imaging element and the optical system based on the shake detection signal from the shake detection unit, the method comprising:
determining whether the shake correction should be performed by the shake correction unit; and
processing an imaging signal read out from a predefined first specific area of the imaging element when it is determined that the shake correction is to be performed, and processing an imaging signal read out from a second specific area of the imaging element that is larger than the first specific area and that includes the first specific area when it is determined that the shake correction is not to be performed.

16. A computer-readable recording medium having stored thereon a data extraction program for a computer of an imaging apparatus comprising: (i) an imaging element which opto-electrically converts an image formed by an optical system and outputs an imaging signal; (ii) a shake detection unit which detects a shake of the apparatus and outputs a shake detection signal; and (iii) a shake correction unit which performs shake correction by changing relative positions of the imaging element and the optical system based on the shake detection signal from the shake detection unit, the program controlling the computer to perform functions comprising:
determining whether the shake correction should be performed by the shake correction unit; and
processing an imaging signal read out from a predefined first specific area of the imaging element when it is determined that the shake correction is to be performed, and processing an imaging signal read out from a second specific area of the imaging element that is larger than the first specific area and that includes the first specific area when it is determined that the shake correction is not to be performed.

* * * * *